(12) United States Patent
Elnikety et al.

(10) Patent No.: US 9,053,210 B2
(45) Date of Patent: Jun. 9, 2015

(54) GRAPH QUERY PROCESSING USING PLURALITY OF ENGINES

(71) Applicant: Microsoft Corporation, Redmond, WA (US)

(72) Inventors: Sameh Elnikety, Redmond, WA (US); Yuxiong He, Bellevue, WA (US); Sherif Sakr, Sydney (AU)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 238 days.

(21) Appl. No.: 13/714,787

(22) Filed: Dec. 14, 2012

(65) Prior Publication Data

US 2014/0172914 A1    Jun. 19, 2014

(51) Int. Cl.
*G06F 17/30* (2006.01)
(52) U.S. Cl.
CPC .... *G06F 17/30979* (2013.01); *G06F 17/30958* (2013.01)
(58) Field of Classification Search
CPC ............... G06F 17/30979; G06F 17/30658
USPC ........................................ 707/773, 774, 775
See application file for complete search history.

(56) References Cited

U.S. PATENT DOCUMENTS

| 5,864,842 | A | 1/1999 | Pederson et al. | |
|---|---|---|---|---|
| 7,337,163 | B1 | 2/2008 | Srinivasan et al. | |
| 7,689,524 | B2 * | 3/2010 | Ozzie et al. | 706/45 |
| 2004/0220923 | A1 * | 11/2004 | Nica | 707/3 |
| 2008/0116449 | A1 | 5/2008 | Macready et al. | |
| 2008/0215543 | A1 * | 9/2008 | Huang et al. | 707/3 |
| 2010/0174704 | A1 | 7/2010 | Ciravegna et al. | |
| 2013/0173662 | A1 * | 7/2013 | Kaplinger et al. | 707/774 |

FOREIGN PATENT DOCUMENTS

| EP | 1492031 A2 | 12/2004 |
|---|---|---|
| EP | 2110761 A2 | 10/2009 |
| WO | 2005/006153 A2 | 1/2005 |

OTHER PUBLICATIONS

Huahai He et al., Graphs-at-a-time: Query Language and Access Methods for Graph Databases, 2008, ACM, 405-417.*
"International Search Report & Written Opinion for PCT Patent Application No. PCT/US2013/075211", Mailed Date: Jul. 29, 2014, Filed Date: Dec. 14, 2013, 12 Pages.
Sakr, et al., "GSPARQL: A Hybrid Engine for Querying Large Attributed Graphs", A Tech Report—MSR-TR-2011-138, Dec. 2011, 28 Pages.

(Continued)

*Primary Examiner* — Jean B Fleurantin
(74) *Attorney, Agent, or Firm* — Steve Wight; Judy Kadoura; Micky Minhas

(57) ABSTRACT

Graph queries are processed using a plurality of independent query execution engines. A graph query submitted to a graph database which is modeled by an attributed graph is received. The graph query is decomposed into a plurality of query components. For each of the query components, a one of the query execution engines that is available to process the query component is identified, a sub-query representing the query component is generated, the sub-query is sent to the identified query execution engine for processing, and results for the sub-query are received from the identified query execution engine. The results received are then combined to generate a response to the graph query.

19 Claims, 22 Drawing Sheets

(56) References Cited

OTHER PUBLICATIONS

Abadi, D. J., A. Marcus, S. R. Madden, K. Hollenbach, Scalable semantic web data management using vertical partitioning, Proc. of the 33rd Int'l Conf. on Very Large Data Bases (VLDB '07), Sep. 23-28, 2007, pp. 411-422, Association for Computing Machinery (ACM), Vienna, Austria.

Bernstein, A., M. Stocker, and C. Kiefer, SPARQL query optimization using selectivity estimation, Poster Proc. of the 6th Int'l Semantic Web Conf., ISWC, Nov. 2007, pp. 2, Busan, Korea, Springer.

Cheng, J., J. X. Yu, On-line exact shortest distance query processing, Proc. of the 12th Int'l Conf. on Extending Database Technology, EDBT 2009, Mar. 24-26, 2009, pp. 481-492, Saint Petersburg, Russia.

Cohen, E., E. Halperin, H. Kaplan, U. Zwick, Reachability and distance queries via 2-hop labels, Proc. of the Thirteenth Annual ACM-SIAM Symposium on Discrete Algorithms, SODA 2002, Jan. 6-8, 2002, pp. 937-946, San Francisco, CA, USA.

Grust, T., M. Mayr, J. Rittinger, S. Sakr, J. Teubner, A SQL:1999 code generator for the pathfinder xquery compiler, Proc. of the ACM SIGMOD Int'l Conf. on Management of Data, SIGMOD 2007, Jun. 11-14, 2007, pp. 1162-1164, Beijing, China.

Grust, T., M. Mayr, J. Rittinger, T. Schreiber, FERRY: Database-supported program execution, Proc. of the ACM SIGMOD Int'l Conf. on Management of Data, SIGMOD 2009, Jun. 29-Jul. 2, 2009, pp. 1063-1066, Providence, Rhode Island, USA.

Grust, T., S. Sakr, J. Teubner, XQuery on SQL Hosts, Proc. of the Thirtieth Int'l Conf. on Very Large Data Bases, VLDB 2004, Aug. 31-Sep. 3, 2004, pp. 252-263, Toronto, Canada.

Huang, J., D. J. Abadi, K. Ren, Scalable SPARQL querying of large RDF graphs, Proc. of the VLDB Endowment, Aug. 2011, pp. 1123-1134, vol. 4, No. 11, Seattle, WA.

Jin, R., Y. Xiang, N. Ruan, D. Fuhry, 3-HOP: A high-compression indexing scheme for reachability query, Proc. of the ACM SIGMOD Int'l Conf. on Management of Data, SIGMOD 2009, Jun. 29-Jul. 2, 2009, pp. 813-826, Providence, Rhode Island, USA.

Neumann, T., G. Weikum, RDF-3X: A RISC-style engine for RDF, Proc. of the VLDB Endowment, PLVDB 2008, Aug. 23-28, 2008, pp. 647-659, vol. 1, No. 1, Auckland, New Zealand.

Pérez, J., M. Arenas, C. Gutierrez, Semantics and complexity of SPARQL, ACM Trans. Database Syst., Aug. 2009, pp. 16:1-16:45, vol. 34, No. 3.

Sakr, S., GraphREL: A decomposition-based and selectivity-aware relational framework for processing sub-graph queries, Proc. of the 14th Int'l Conf. on Database Systems for Advanced Applications, DASFAA 2009, Apr. 21-23, 2009, pp. 123-137, LNCS 5463, Brisbane, Australia.

Sarwat, M., S. Elnikety, Y. He, G. Kliot, Horton: Online query execution engine for large distributed graphs, IEEE 28th Int'l Conf. on Data Eng'g, ICDE 2012, Apr. 1-5, 2012, pp. 1289-1292, Washington, DC, USA.

Tong, H., B. Gallagher, C. Faloutsos, T. Eliassi-Rad, Fast best-effort pattern matching in large attributed graphs, Proc. of the 13th ACM SIGKDD Int'l Conf. on Knowledge Discovery and Data Mining, KDD 2007, pp. 737-746, Aug. 12-15, 2007, San Jose, California, USA.

Umbrich, J., M. Karnstedt, A. Hogan, J. X. Parreira, Freshening up while staying fast: Towards hybrid SPARQL queries, Proc. of the 18th Int'l Conf. on Knowledge Eng'g and Knowledge Management, EKAW 2012, Oct. 8-12, 2012, pp. 164-174, vol. 7603, Galway City, Ireland.

Wang, H., T. Tran, C. Liu, CE2: Towards a large scale hybrid search engine with integrated ranking support, Proc. of the 17th ACM Conf. on Info. and Knowledge Management, CIKM 2008, Oct. 26-30, 2008, pp. 1323-1324, Napa Valley, California, USA.

Wei, F., TEDI: Efficient shortest path query answering on graphs, Graph Data Management: Techniques and Applications, SIGMOD'10, Jun. 6-11, 2010, pp. 214-238, Indianapolis, Indiana, USA.

Yan, X., P. S. Yu, J. Han, Graph indexing: A frequent structure-based approach, Proc. of the ACM SIGMOD Int'l Conf. on Management of Data, SIGMOD Conf. 2004, Jun. 13-18, 2004, pp. 335-346, Paris, France.

Zhang, S., M. Hu, J. Yang, TreePi: A novel graph indexing method, Proc. of the 23rd Int'l Conf. on Data Eng'g, ICDE 2007, Apr. 15-20, 2007, pp. 966-975, The Marmara Hotel, Istanbul, Turkey.

Zhao, P., J. Han, On graph query optimization in large networks, Proc. of the VLDB Endowment, Sep. 2010, pp. 340-351, vol. 3, No. 1.

Zou, L., L. Chen, M. T. Özsu, D. Zhao, Answering pattern match queries in large graph databases via graph embedding, The VLDB Journal, Feb. 2012, pp. 97-120, vol. 21, No. 1.

Zou, L., J. Mo, L. Chen, M. T. Özsu, D. Zhao, gStore: Answering SPARQL queries via subgraph matching, Proceedings of the VLDB Endowment, PVLDB 2011, May 2011, pp. 482-493, vol. 4, No. 8.

\* cited by examiner

| | | |
|---|---|---|
| <Query> | = | SELECT <VarList><br>WHERE{ <Triple>+<br>[FILTER (<Predicate>)]*<br>[FILTERPATH (<PathPredicate>)]* } |
| <VarList> | = | {?var \| <PathVar>} |
| <PathVar> | = | ??var \| ?*var |
| <Triple> | = | <Term> (<Term> \| <Edge> \| <Path> ) <Term> |
| <Term> | = | literal \| ?var |
| <Edge> | = | literal \| literal+ \| @literal \| ?var(literal) |
| <Path> | = | <PathVar> \| <PathVar>(literal) |
| <Predicate> | = | BooleanFunction |
| <PathPredicate> | = | Length(<PathVar>, Predicate) \|<br>AtLeastNode(<PathVar>, number, Predicate) \|<br>AtMostNode(<PathVar>, number, Predicate) \|<br>ALLNodes(<PathVar>, Predicate) \|<br>AtLeastEdge(<PathVar>, number, Predicate) \|<br>AtMostEdge(<PathVar>, number, Predicate) \|<br>AllEdges(<PathVar>, Predicate) |

FIG. 2

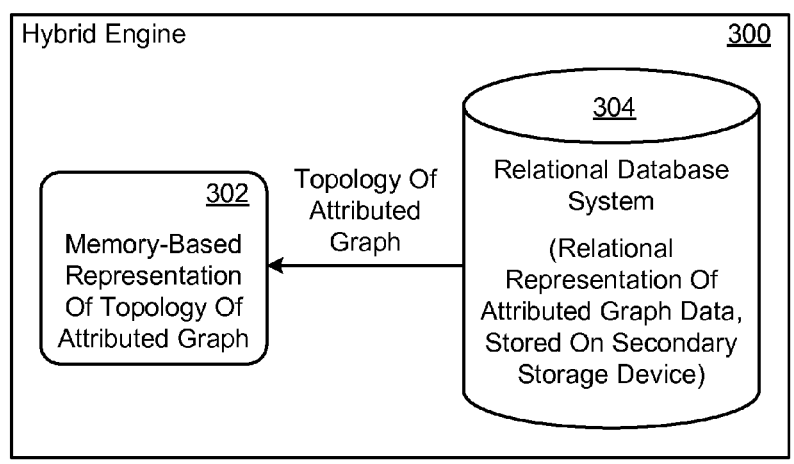

FIG. 3

| Operator | Description | Relational? |
|---|---|---|
| NgetAttVal$_{ID,(attName)}$:$ID,value$ | Returns the values of an attribute for a set of nodes. | Yes |
| EgetAttVal$_{eID,(attName)}$:$eID,value$ | Returns the values of an attribute for a set of edges. | Yes |
| getEdgeNodes$_{sID,[(eLabel)]}$:$sID,eID,dID$ | Returns adjacent nodes, optionally through a specific relation, for a set of graph nodes. | Yes |
| strucPred$_{sID,(eLabel),(dNLabel)}$:$sID,[eID]$ | Returns a set of vertices that are adjacent to other vertices with a specific relationship and optionally returns the connecting edges. | Yes |
| edgeJoin$_{sID,dID,[(eLabel)]}$:$sID,dID,[eID]$ | Returns pairs of vertices that are connected with an edge, optionally of a specified relationship, and optionally returns the connecting edges. | Yes |
| pathJoin$_{sID,dID,[(eLabel)]}$:$sID,dID,[pID,pRel]$ | Returns pairs of vertices which are connected by a sequence of edges of any length, optionally with a specified relationship, and optionally returns connecting paths. | No |
| sPathJoin$_{sID,dID,[(eLabel)]}$:$sID,dID,pID,pRel$ | Returns pairs of vertices which are connected by a sequence of edges of any length, optionally with a specified relationship, and returns the shortest connecting path. | No |
| filterPath$_{pID,pRel,(cond)}$:$pID,pRel$ | Returns paths that satisfy a condition. | No |

FIG. 7

$NgetAttVal_{nodeID,(attName):value} \Rightarrow \pi_{R.*,attName.value}(R \bowtie_{R:nodeID=attName.ID} attName)$ $EgetAttVal_{edgeID,(attName):value} \Rightarrow \pi_{R.*,attName.value}(R \bowtie_{R:edgeID=attName.ID} attName)$ $getEdgeNodes_{sID,(eLabel):eID,dID} \Rightarrow \pi_{R.*,eLabel.eID,eLabel.dID}(R \bowtie_{R.sID=eLabel.sID} eLabel)$ $getEdgeNodes_{sID:eID,dID} \Rightarrow \pi_{R.*,allEdges.eID,allEdges.dID}(R \bowtie_{R.sID=allEdges.sID} allEdges)$ $strucPred_{sID,(eL),(dNL)} \Rightarrow \sigma_{nodeLabel.Value=dNL}((R \bowtie_{R.sID=eL.sID} eL) \bowtie_{eL.dID=nodeLabel.ID} nodeLabel)$ $strucPred_{sID,(eL),(dNL):eID} \Rightarrow \pi_{R.*,eL.eID}(\sigma_{nodeLabel.Value=dNL}((R \bowtie_{R.sID=eL.sID} eL)$
$\bowtie_{eL.dID=nodeLabel.ID} nodeLabel))$ $edgeJoin_{R.sID,S.dID} \Rightarrow \pi_{R.*,S.*}((R \bowtie_{R.sID=allEdges.sID} allEdges) \bowtie_{allEdges.dID=S.dID} S)$ $edgeJoin_{R.sID,S.dID:eID} \Rightarrow \pi_{R.*,S.*,allEdges.eID}((R \bowtie_{R.sID=allEdges.sID} allEdges) \bowtie_{allEdges.dID=S.dID} S)$ $edgeJoin_{R.sID,S.dID,(eLabel)} \Rightarrow \pi_{R.*,S.*}((R \bowtie_{R.sID=eLabel.sID} eLabel) \bowtie_{eLabel.dID=S.dID} S)$ $edgeJoin_{R.sID,S.dID,(eLabel):eID} \Rightarrow \pi_{R.*,S.*,eLabel.eID}((R \bowtie_{R.sID=eLabel.sID} eLabel) \bowtie_{eLabel.dID=S.dID} S)$

FIG. 9

$$SQL(\text{strucPred}_{sID,(eLabel),(dNLabel):eID}) \Rightarrow$$
```
SELECT R.*, eLabel.eID FROM R, eLabel, NodeLabel
WHERE R.sID = eLabel.sID AND eLabel.dID = dNlabel.ID
AND NodeLabel.Value = 'dNLabel';
```
(TRANS-6)

$$SQL(t_1) : R \quad SQL(t_2) : S$$
$$SQL(\text{edgeJoin}_{R.sID,S.dID}) \Rightarrow$$
```
SELECT R.*, S.* FROM R, S, allEdges
WHERE R.sID = allEdges.sID AND allEdges.dID = S.dID;
```
(TRANS-7)

$$SQL(t_1) : R \quad SQL(t_2) : S$$
$$SQL(\text{edgeJoin}_{R.sID,S.dID:eID}) \Rightarrow$$
```
SELECT R.*, S.*, eLabel.eID FROM R, S, allEdges
WHERE R.sID = allEdges.sID AND allEdges.dID = S.dID;
```
(TRANS-8)

$$SQL(t_1) : R \quad SQL(t_2) : S$$
$$SQL(\text{edgeRJoin}_{R.sID,S.dID,(eLabel)}) \Rightarrow$$
```
SELECT R.*, S.* FROM R, S, eLabel
WHERE R.sID = eLabel.eID FROM R, S, eLabel
WHERE R.sID = eLabel.sID AND eLabel.dID = S.dID;
```
(TRANS-9)

$$SQL(t_1) : R \quad SQL(t_2) : S$$
$$SQL(\text{edgeRJoin}_{R.sID,S.dID,(eLabel):eID}) \Rightarrow$$
```
SELECT R.*, S.*, eLabel.eID FROM R, S, eLabel
WHERE R.sID = eLabel.sID AND eLabel.dID = S.dID;
```
(TRANS-10)

FIG. 10B $$\frac{(?var, @attName, ?var2)}{Map(?var) \in R \quad Col(?var2) \Rightarrow NgetAttVal_{ID,(attName):value}(R)} \quad (\text{OpMap-1})$$

$$\frac{(?var, @attName, 'attValue')}{Map(?var) \in R \quad Col(?var) \equiv ID} \Rightarrow \pi_{ID}(\sigma_{value='attValue'}(NgetAttVal_{ID,(attName):value}(R))) \quad (\text{OpMap-2})$$

$$\frac{(subject, ?E(predicate), object) \in Triple(q)}{(?E, @attName, ?var)} \quad Map(?E) \in R \quad Col(?E) \equiv ID \Rightarrow EgetAttVal_{ID,(attName):value}(R) \quad (\text{OpMap-3})$$

$$\frac{(subject, ?E(predicate), object) \in Triple(q)}{(?E, @attName, 'attValue')} \quad Map(?E) \in R \quad Col(?E) \equiv ID \Rightarrow \pi_{ID}(\sigma_{value='attValue'}(EgetAttVal_{ID,(attName):value}(R))) \quad (\text{OpMap-4})$$

$$\frac{(?var, eLabel, dNLabel)}{Map(?var) \in R \quad Col(?var) \equiv sID} \Rightarrow strucPred_{sID,(eLabel),(dNLabel)}(R) \quad (\text{OpMap-5})$$

$$\frac{(?E, predicate, object) \in Triple(q)}{(?var, ?E(eLabel), dNLabel)} \quad Map(?var) \in R \quad Col(?var) \equiv sID \Rightarrow strucPred_{sID,(eLabel),(dNLabel):eID}(R) \quad (\text{OpMap-6})$$

FIG. 12A $$\frac{(?var, eLabel, ?var2) \Rightarrow \quad getEdgeNodes_{sID,(eLabel):eID,dID}(R) \quad Map(?var) \in R \quad Col(?var) \equiv sID \quad Col(eLabel.eID) \equiv eID \quad Col(?var2) \equiv dID}{} \quad (\text{OpMap-7})$$

$$\frac{(?var, eLabel, ?var2) \Rightarrow \quad getEdgeNodes_{sID,:eID,dID}(R) \quad Map(?var) \in R \quad Col(?var) \equiv sID \quad Col(allEdges.eID) \equiv eID \quad Col(?var2) \equiv dID}{} \quad (\text{OpMap-8})$$

$$\frac{(?E, predicate, object) \in Triple(q)}{(?var, ?E(eLabel), ?var2) \Rightarrow \quad (R) \ edgeJoin_{sID,dID,(eLabel):eID}(S) \quad Map(?var) \in R \quad Col(?var) \equiv sID \quad Map(?var2) \in S \quad Col(?var2) \equiv dID \quad Col(?E) \equiv eID} \quad (\text{OpMap-9})$$

$$\frac{Map(?var) \in R \quad Col(?var) \equiv sID \quad Map(?var2) \in S \quad Col(?var2) \equiv dID}{(?var, eLabel, ?var2) \Rightarrow \quad (R) \ edgeJoin_{sID,dID,(eLabel)}(S)} \quad (\text{OpMap-10})$$

$$\frac{(?E, predicate, object) \in Triple(q) \quad Map(?var) \in R \quad Col(?var) \equiv sID \quad Map(?var2) \in S \quad Col(?var2) \equiv dID}{(?var, ?E, ?var2) \Rightarrow \quad (R) \ edgeJoin_{sID,dID:eID}(S) \quad Col(?E) \equiv eID} \quad (\text{OpMap-11})$$

FIG. 12B $$\frac{\text{Map}(?var) \in R \quad \text{Col}(?var) \equiv sID}{\text{Map}(?var2) \in S \quad \text{Col}(?var2) \equiv dID} \quad (\text{OpMap-12})$$
$$(?var, ?E, ?var2) \Rightarrow (R) \text{ edgeJoin}_{sID,dID} (S)$$

$$\frac{\begin{array}{l}\text{Map}(?var) \in R \quad \text{Col}(?var) \equiv sID \\ \text{Map}(?var2) \in S \quad \text{Col}(?var2) \equiv dID \\ \text{FilterPath}(??P) \in \text{PathFilter}(q)\end{array}}{\begin{array}{l}(?var, ??P, ?var2) \Rightarrow (R) \text{ pathJoin}_{sID,dID:pID,pRel} (S) \\ \text{Col}(??P) \equiv pID \\ \text{Schema}(pRel) = (pID, \text{ type}, \text{ order}, ID, \text{Label})\end{array}} \quad (\text{OpMap-13})$$

$$\frac{\begin{array}{l}\text{Map}(?var) \in R \quad \text{Col}(?var) \equiv sID \\ \text{Map}(?var2) \in S \quad \text{Col}(?var2) \equiv dID \\ \text{FilterPath}(??P) \in \text{PathFilter}(q)\end{array}}{\begin{array}{l}(?var, ??P(eLabel), ?var2) \Rightarrow (R) \text{ pathJoin}_{sID,dID,(eLabel):pID,pRel} (S) \\ \text{Col}(??P) \equiv pID \\ \text{Schema}(pRel) = (pID, \text{ type}, \text{ order}, ID, \text{Label})\end{array}} \quad (\text{OpMap-14})$$

FIG. 12C $$\frac{\mathrm{Map}(?\mathrm{var}) \in \mathrm{R} \quad \mathrm{Col}(?\mathrm{var}) \equiv \mathrm{sID}}{\mathrm{Map}(?\mathrm{var2}) \in \mathrm{S} \quad \mathrm{Col}(?\mathrm{var2}) \equiv \mathrm{dID}}$$
$$(?\mathrm{var},\ ??\mathrm{P},\ ?\mathrm{var2}) \Rightarrow\ (\mathrm{R})\ \mathrm{pathJoin}_{sID,dID}\ (\mathrm{S}) \quad (\text{OpMap-15})$$

$$\frac{\mathrm{Map}(?\mathrm{var}) \in \mathrm{R} \quad \mathrm{Col}(?\mathrm{var}) \equiv \mathrm{sID}}{\mathrm{Map}(?\mathrm{var2}) \in \mathrm{S} \quad \mathrm{Col}(?\mathrm{var2}) \equiv \mathrm{dID}}$$
$$(?\mathrm{var},\ ??\mathrm{P}(e\mathrm{Label}),\ ?\mathrm{var2}) \Rightarrow\ (\mathrm{R})\ \mathrm{pathJoin}_{sID,dID:(eLabel)}\ (\mathrm{S}) \quad (\text{OpMap-16})$$

$$\frac{\mathrm{Map}(?\mathrm{var}) \in \mathrm{R} \quad \mathrm{Col}(?\mathrm{var}) \equiv \mathrm{sID}}{\mathrm{Map}(?\mathrm{var2}) \in \mathrm{S} \quad \mathrm{Col}(?\mathrm{var2}) \equiv \mathrm{dID}}$$
$$\mathrm{FilterPath}(?*\mathrm{P}) \in \mathrm{PathFilter}(q)$$
$$(?\mathrm{var},\ ?*\mathrm{P},\ ?\mathrm{var2}) \Rightarrow\ (\mathrm{R})\ \mathrm{sPathJoin}_{sID,dID:pID,pRel}\ (\mathrm{S}) \quad (\text{OpMap-17})$$
$$\mathrm{Col}(?*\mathrm{P}) \equiv \mathrm{pID}$$
$$\mathrm{Schema}(\mathrm{pRel}) = (\mathrm{pID},\ \mathrm{type},\ \mathrm{order},\ \mathrm{ID},\ \mathrm{Label})$$

$$\frac{\mathrm{Map}(?\mathrm{var}) \in \mathrm{R} \quad \mathrm{Col}(?\mathrm{var}) \equiv \mathrm{sID}}{\mathrm{Map}(?\mathrm{var2}) \in \mathrm{S} \quad \mathrm{Col}(?\mathrm{var2}) \equiv \mathrm{dID}}$$
$$\mathrm{FilterPath}(?*\mathrm{P}) \in \mathrm{PathFilter}(q)$$
$$(?\mathrm{var},\ ?*\mathrm{P}(e\mathrm{Label}),\ ?\mathrm{var2}) \Rightarrow\ (\mathrm{R})\ \mathrm{sPathJoin}_{sID,dID:(eLabel):pID,pRel}\ (\mathrm{S}) \quad (\text{OpMap-18})$$
$$\mathrm{Col}(?*\mathrm{P}) \equiv \mathrm{pID}$$
$$\mathrm{Schema}(\mathrm{pRel}) = (\mathrm{pID},\ \mathrm{type},\ \mathrm{order},\ \mathrm{ID},\ \mathrm{Label})$$

FIG. 12D

GRAPH QUERY PROCESSING USING PLURALITY OF ENGINES

BACKGROUND

A graph database is a type of data structure where one or more graphs are used to model the structural relationships between data objects in a data set. Each of the graphs employs nodes (also known as vertices), edges and attributes (also known as properties) to represent and store the data objects. Generally speaking, the nodes in a given graph represent entity instances such as people, businesses, accounts, or any other item of interest. The edges in the graph represent the connections that exist between pairs of nodes. The attributes in the graph are pertinent data that relates to the nodes. Depending on the particular type of graph (e.g., the particular type of data model) being implemented, the attributes in the graph may also be pertinent data that relates to the edges. It is becoming increasingly popular to use graph databases to model complicated, large data sets in a variety of application domains such as bioinformatics applications, cheminformatics applications, repositories of business process models, social network applications, bibliographic network applications, and knowledge base applications.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Graph query processing technique embodiments described herein generally involve responding to graph queries. In an exemplary embodiment a graph query submitted to a graph database which is modeled by an attributed graph is received. The graph query is then decomposed into a plurality of query components. Then, for each of the query components, a one of a plurality of independent query execution engines that is available to process the query component is identified, a sub-query representing the query component is generated, the sub-query is sent to the identified query execution engine for processing, and results for the sub-query are received from the identified query execution engine. The results received are then combined to generate a response to the graph query.

DESCRIPTION OF THE DRAWINGS

The specific features, aspects, and advantages of the graph query processing technique embodiments described herein will become better understood with regard to the following description, appended claims, and accompanying drawings where:

FIG. 2 is a listing illustrating the grammar of an exemplary embodiment of a graph query language for querying an attributed graph.

FIG. 3 is a diagram illustrating an exemplary embodiment, in simplified form, of a hybrid engine implementation of a query execution engine.

FIG. 7 is a listing illustrating an exemplary embodiment of a set of algebraic operators that can be used in the graph query language.

FIG. 9 is a listing illustrating exemplary embodiments of mappings for the algebraic operators that can be translated into a pattern of conventional relational operators.

FIGS. 10A and 10B are a listing illustrating exemplary embodiments of inference rules for the SQL (Structured Query Language) translation templates of the algebraic operators.

FIGS. 12A-12D are a listing illustrating exemplary embodiments of inference rules for mapping the triple patterns of a graph query onto the set of algebraic operators.

DETAILED DESCRIPTION

Figure 1:
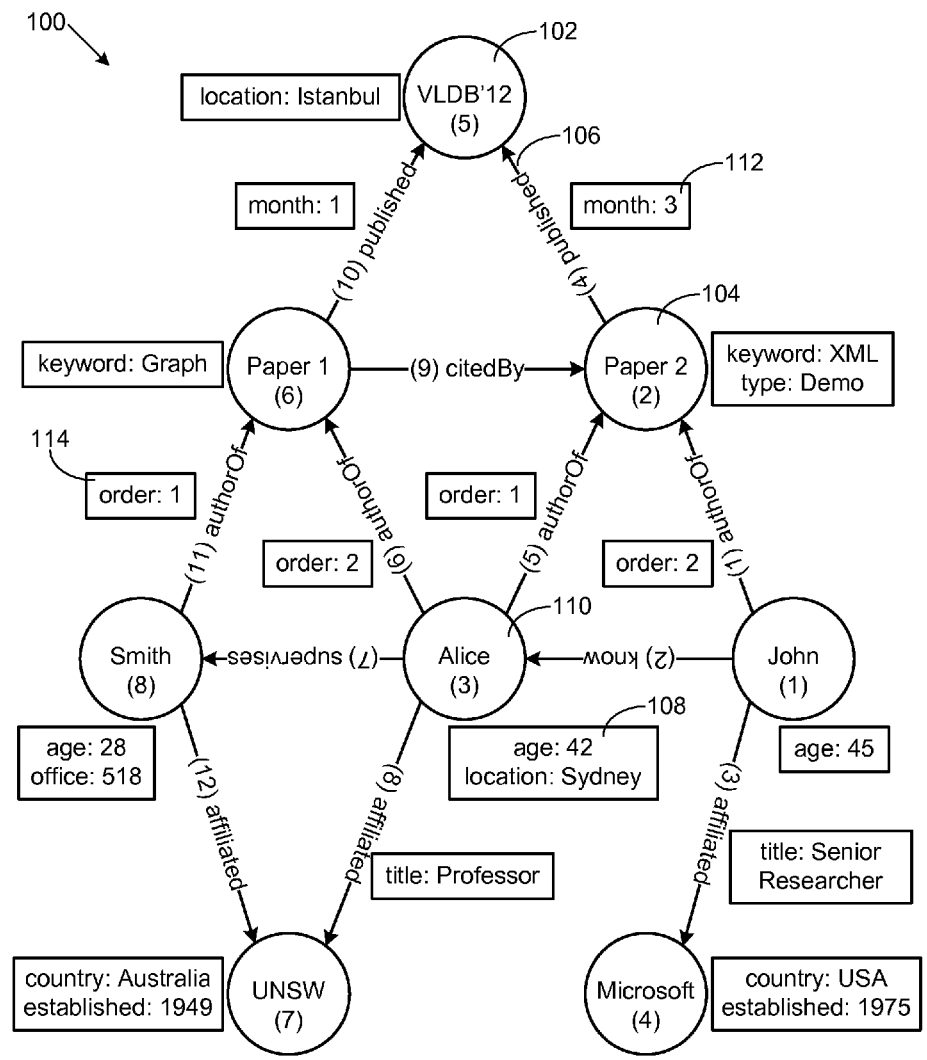
FIG. 1 is a diagram illustrating an exemplary embodiment, in simplified form, of a snippet of an attributed graph that models a bibliographic network data set.

In the following description of graph query processing technique embodiments reference is made to the accompanying drawings which form a part hereof, and in which are shown, by way of illustration, specific embodiments in which the graph query processing technique can be practiced. It is understood that other embodiments can be utilized and structural changes can be made without departing from the scope of the graph query processing technique embodiments.

It is also noted that for the sake of clarity specific terminology will be resorted to in describing the graph query processing technique embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the graph query processing technique. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations. Yet furthermore, the order of process flow representing one or more embodiments or implementations of the graph query processing technique does not inherently indicate any particular order not imply any limitations of the graph query processing technique.

The term "path" is used herein to refer to a sequence of edges in a graph which are interconnected by nodes. The term "attributed graph data model" (herein sometimes simply referred to as an attributed graph) is used herein to refer to a particular type of graph that can include one or more attributes for each of the nodes in the graph, and can also include one or more attributes for each of the edges in the graph. The term "secondary storage device" is used herein to refer to a storage device such as one or more hard disk drives, or the like.

1.0 Graph Query Processing Using a Plurality of Engines

Generally speaking, the graph query processing technique embodiments described herein involve responding to (e.g., evaluating and answering, herein sometimes also referred to as executing) queries that are submitted by an entity to a graph database which is modeled by an attributed graph (such queries are herein sometimes simply referred to as graph queries). This entity can be either an end user, or a computing device, among other things.

The graph query processing technique embodiments described herein are advantageous for various reasons including, but not limited to, the following. As will be appreciated from the more detailed description that follows, the graph query processing technique embodiments provide a scalable indexing mechanism for attributed graphs which optimizes the efficiency of searching/analyzing large attributed graphs. The graph query processing technique embodiments also accelerate the processing of many different types of graph queries without having to build and maintain different types of indices of the graph database (which would consume a large amount of memory). In other words, the graph query processing technique embodiments optimize the performance of graph query processing and minimize the amount of memory that is consumed during graph query processing. This memory consumption minimization allows the graph query processing technique embodiments to scale and support the querying of larger and more complex graph databases that are modeled by larger and more complex attributed graphs using a given fixed size of memory.

The graph query processing technique embodiments described herein also support querying both the topology of the attributed graph and data objects in the graph (e.g., the attributes of the nodes and edges in the graph). As such, the graph query processing technique embodiments can efficiently evaluate and answer a graph query that combines both predicates which are based on the topology of the attributed graph and predicates which are based on the attributes of the nodes and edges in the graph. Accordingly, the graph query processing technique embodiments support the processing of a complex graph query that can include a combination of two or more different types of graph query components such as, a pattern match component, a reachability component, and a shortest path component, among others. The graph query processing technique embodiments also support interactive, online graph query processing (e.g., these embodiments are not limited to working in just a batch mode).

The graph query processing technique embodiments described herein also make use of the following heuristics. Due to the powerful indexing and sophisticated query optimization techniques that exist for relational database systems, relational database systems are generally very efficient for executing graph queries and query components thereof that represent structural predicates or value-based predicates on the attributes of nodes and/or edges in an attributed graph. Additionally, relational database systems are generally very efficient for finding graph query execution plans that perform well since they support the consideration of different possible execution plan variants such as different join implementations and different join orderings. In contrast, relational database systems are generally inefficient for executing graph queries and query components thereof that involve operations of a recursive nature (e.g., traversal operations over the topology of the attributed graph). However, and as will be appreciated from the more detailed description that follows, various graph engines exist which are efficient for executing such recursive operations.

1.1 Graph Databases

Graph databases can be classified in various ways. By way of example but not limitation, graph databases can be classified according to the number and size of the graphs that are used therein. More particularly, graph databases that are made up of a large number of small graphs can be assigned to a first category of graph databases. Graph databases that fall into this first category are sometimes referred to as transactional graph databases, and are commonly used to model the aforementioned data sets associated with bioinformatics applications, cheminformatics applications, and repositories of business process models, among others. Graph databases that are made up of either just a single large graph or a very small number of large graphs can be assigned to a second category of graph databases. Graph databases that fall into this second category are commonly used to model the aforementioned data sets associated with social network applications, bibliographic network applications, and knowledge base applications, among others.

There are three common types of graph queries that are commonly used to query the second category of graph databases, namely a pattern match graph query, a reachability graph query, and a shortest path graph query. The pattern match graph query tries to find the existence(s) of a graph pattern (e.g., either a path, or a star, or a sub-graph, among others) in the large graph(s). The reachability graph query verifies if a connection/path exists between any two nodes in the large graph(s). The shortest path graph query is a variant of the reachability graph query that returns the shortest path distance (in terms of the number of edges) between any two nodes which are connected in the large graph(s). Both the reachability and shortest path queries may return the queried connections/paths. A given complex graph query that is submitted by an entity to the second category of graph databases can include a plurality of different types of query components. More particularly and by way of example but not limitation, the complex graph query can include either one or more pattern match components, or one or more reachability components, or one or more shortest path components. The complex graph query can also generally include any combination of these different components. More particularly, the complex graph query can include one or more of, one or more pattern match components, or one or more reachability components, or one or more shortest path components.

In many real world applications, each of the nodes in the graph(s) can be labeled with one or more attributes that specify pertinent data relating to the node. Depending on the particular type of graph database that is being implemented, each of the edges in the graph(s) can also be labeled with one or more attributes that specify the type of relationship that exists between the two nodes which are connected by the edge. By way of example but not limitation, in a graph that is used to model a social network, a given node in the graph can represent a given person in the network, this node can be labeled with an attribute that specifies the age of the person, and the topology of the graph can represent different types of relationships (sometime referred to as directed edges) that exist between the person and other people in the network. In the case where the graph is implemented as an attributed graph, each of these relationships can be labeled with a start date attribute. Such a graph that can include attributes for the nodes in the graph, as well as attributes for the edges in the graph, is referred to herein as an attributed graph. It will be appreciated that both the topology of an attributed graph and the attributes of the nodes and edges therein, represent valuable information.

An attributed graph can be formally denoted as $(V, E, L_v, L_e, F_v, F_e, A_v, A_e)$ where V is a set of the nodes in the graph, $E \subseteq V \times V$ is a set of the edges in the graph that join two distinct nodes, $L_v$ is a set of the labels for V, $L_e$ is a set of the labels for E, $F_v$ is a function $V \rightarrow L_v$ that assigns labels to each of the nodes, and $F_e$ is a function $E \rightarrow L_e$ that assigns labels to each of the edges. $A_v = \{a_1, a_2, \ldots, a_m\}$ is a set of m attributes that can be associated with any node in V. Each of the nodes $v \in V$ can be labeled with an attribute vector $[a_1(v), \ldots, a_m(v)]$, where $a_j(v)$ is the attribute value of node v on attribute $a_j$. $A_e = \{b_1, b_2, \ldots, b_n\}$ is a set of n attributes that can be associated with any edge in E. Similarly, each of the edges $e \in E$ can be labeled with an attribute vector $[b_1(e), \ldots, b_n(e)]$, where $b_k(e)$ is the attribute value of edge e on attribute $b_k$.

FIG. 1 illustrates an exemplary embodiment, in simplified form, of a snippet of an attributed graph (hereafter sometimes simply referred to as a graph snippet) that models a bibliographic network data set. As exemplified in FIG. 1, each of the nodes (e.g., 102, 104) in the graph snippet 100 represents an entity instance such as an author, or a paper, or a conference, among others. Each of the edges (e.g., 106) in the graph snippet 100 represents a structural relationship (e.g., author of, or affiliated, or published, among others) that exists between the two nodes (e.g., 102, 104) which are connected by the edge. Each of the nodes (e.g., 110) can be labeled with one or more attributes (e.g., 108) that describe the node; examples of such attributes include age, keyword, and location, among others. Each of the edges (e.g., 106) can be labeled with one or more attributes (e.g., 112) that describe the edge; examples of such attributes include order, title and month, among others. A user of the graph database that stores the bibliographic network data set which is modeled in part by the graph snippet 100 may submit a complex graph query to the database that can include a plurality of query components. Various graph query scenarios will now be described that exemplify this situation.

Referring again to FIG. 1, a user may submit a graph query that seeks to find the names of two authors, X and Y, where X and Y are connected by a path of any length (e.g., any number of edges), the author X is affiliated at the University of New South Wales (UNSW), the author Y is affiliated at Microsoft, and both of the authors has published a paper at the Very Large Databases 2012 conference (VLDB '12). It will be appreciated that this particular graph query includes both a pattern match component and a reachability component. A user may also submit a graph query that seeks to find the names of two authors, X and Y, where X and Y are connected by a path of any length, the author X is affiliated at UNSW, the author Y is affiliated at Microsoft, both of the authors has published a paper at VLDB '12 as a first author (e.g., 114), and both of the authors has an age which is greater than or equal to 35. It will be appreciated that this particular graph query includes both a pattern match component and a reachability component, where the pattern match component has conditions on the attributes of the nodes and edges in the graph snippet 100.

Referring again to FIG. 1, a user may also submit a graph query that seeks to find the names of two authors, X and Y, and the connecting path(s) there-between, where X and Y are connected by a path having a length which is less than or equal to three edges, the author X is affiliated at UNSW, the author Y is affiliated at Microsoft, and both of the authors has published a paper at VLDB '12 as a first author (e.g., 114). It will be appreciated that this particular graph query includes both a pattern match component and a reachability component, where the reachability component is constrained by a path filtering condition and returns data specifying the connecting path(s) as part of the graph query results.

Referring again to FIG. 1, a user may also submit a graph query that seeks to find the names and the ages of two authors, X and Y, and the shortest path there-between, where the author X is affiliated at UNSW, the author Y is affiliated at Microsoft, and both of the authors has published a paper at VLDB '12. It will be appreciated that this particular graph query includes both a pattern match component and a shortest path component. A user may also submit a graph query that seeks to find the titles of two papers, P1 and P2, and the path there-between, where each of the edges in the path represents a "cited by" relationship, the maximum path length is three edges, the first author of P1 is affiliated at UNSW, and the first author of P2 is affiliated at Microsoft. It will be appreciated that this particular graph query includes both a pattern match component and a constrained reachability component, where the pattern match component has conditions on the attributes of the edges in the graph snippet 100.

It will be appreciated that the foregoing graph query scenarios are exemplary and various other scenarios are also possible.

1.2 G-SPARQL Graph Query Language and Supported Types of Queries

This section describes an exemplary embodiment of a graph query language, herein referred to as graph-SPARQL (G-SPARQL), for querying an attributed graph. G-SPARQL is advantageous for various reasons including, but not limited to, the following. As will be appreciated from the more detailed description that follows, G-SPARQL supports a declarative query programming interface which allows for optimizing the efficiency of graph query processing in situations where the programmer has little or no knowledge about the characteristics of the underlying attributed graphs. G-SPARQL is also able to express graph queries about arbitrary path structures in the attributed graph. As such and as described heretofore, G-SPARQL supports complex graph queries that include a plurality of different types of query components such as the pattern match component, the reachability component, and the shortest path component, among others, and any combination thereof. G-SPARQL is also sufficiently expressive to satisfy a wide variety of user query needs. The syntax expressions in G-SPARQL are also clear and concise.

FIG. 2 illustrates the grammar of G-SPARQL. As exemplified in FIG. 2, a non-terminal Query defines a G-SPARQL query and is the start symbol of this grammar. The syntax and semantics of G-SPARQL are described in more detail hereafter.

As is appreciated in the art of graph databases, the conventional Resource Description Framework (RDF) is a family of World Wide Web Consortium (W3C) specifications that define a data format for modeling data objects that are implemented in web resources. In the RDF data model (herein sometimes simply referred to as an RDF graph) an expression that specifies a subject, a predicate and an object can be used to make statements about resources in an RDF graph. Such an expression is known as a triple (or triple pattern) in RDF terminology and will be described in more detail hereafter.

Generally speaking, the RDF graph data model can be considered to be a variant of the attributed graph data model. One difference between the RDF and attributed graph data models is the following. In an RDF graph the edges in the graph cannot be labeled with attributes that describe the edges (just the nodes in an RDF graph can be labeled with attributes). In contrast and as described heretofore, in an attributed graph both the nodes and the edges in the graph can be labeled with an arbitrary set of attributes. Another difference between the RDF and attributed graph data models is the following. In an RDF graph the edges in the graph are used to represent both the data in the graph (e.g., the attributes of the nodes in the RDF graph) and the structural relationships that exist between the nodes in the graph (e.g., the topology of the RDF graph). The edges in an RDF graph represent the data in the graph by connecting the nodes to their attributes. Thus, the data in an RDF graph is represented as part of the graph topology, which results in a significant increase in the size of the graph topology. In contrast and as described heretofore, in an attributed graph the data in the graph (e.g., the attributes of the nodes and edges in the graph) is represented separately from the topology of the graph.

As is appreciated in the art of database query languages, SPARQL (a recursive acronym for SPARQL Protocol and RDF Query Language) is an industry standard query language for querying graph databases that are modeled by one or more RDF graphs. SPARQL was made an industry standard by the W3C.

1.2.1 Querying Attributes of Nodes and Edges Using G-SPARQL

SPARQL employs powerful graph pattern matching facilities that allow the binding of variables to components in the RDF graph that is being queried. A given SPARQL query defines a graph pattern P that is matched against an RDF graph G, where each of the variables in P is replaced by the matching elements of G such that the resulting graph pattern is included in G (e.g., graph pattern matching). The main construct of building P is known as a triple pattern in the art of graph databases. A triple pattern represents the aforementioned RDF triple (subject, predicate, object). The subject of the triple pattern represents an entity instance (e.g., a node) in G. The predicate in the triple pattern represents a connection (e.g., an edge) to an object in G, where this object can represent either another entity instance (e.g., another node) in G or an attribute in G. The subject, predicate and object can each represent either a constant value or a variable (herein denoted as ?var). Hence, a set of different triple patterns concatenated by an AND (.) operator can be used to represent a desired graph pattern of a SPARQL query. The following is an exemplary SPARQL query that seeks to find all persons who are affiliated at UNSW and are at least 42 years old:

SELECT ?X
WHERE {?X affiliatedAt UNSW. ?X age ?age.
  FILTER (?age >= 42)}

G-SPARQL is a SPARQL-like graph query language that can be used to query attributed graphs. G-SPARQL employs the general graph pattern matching facilities of SPARQL, but also enhances SPARQL in various ways including, but not limited to, the following. As will be appreciated from the more detailed description that follows, G-SPARQL introduces new constructs that also query the just-described differences between the RDF and attributed graph data models. G-SPARQL supports querying for a defined structural pattern in an attributed graph, and allows filtering conditions to be specified on the attributes of the nodes and/or edges that are part of this pattern. G-SPARQL also supports querying for a defined path that connects the nodes in an attributed graph, where this defined path can have an unknown length. More particularly, G-SPARQL allows for the expression of reachability and shortest path graph queries between the nodes, where such queries can include filtering conditions on the defined path (e.g., such queries can place constraints on the path length or on the types and properties of edges and nodes). G-SPARQL employs a powerful algebraic compilation and re-writing framework for logical query plans which serve to optimize the graph query processing. As such, G-SPARQL can be efficiently implemented and is able to efficiently query attributed graphs.

G-SPARQL is able to differentiate between the representations of two different types of query predicates, namely structural predicates and value-based predicates. As will be described in more detail hereafter, a structural predicate specifies a condition on the structural relationship between the nodes in an attributed graph, where the subject and object of the triple pattern specify nodes and the predicate of the triple pattern specifies an edge. A value-based predicate specifies a condition on the value of an attribute in the attributed graph, where the subject of the triple pattern specifies either a node or an edge, the predicate of the triple pattern specifies an attribute name, and the object of the triple pattern specifies an attribute value.

The syntax of G-SPARQL differentiates value-based predicates from structural predicates in the following manner. G-SPARQL prepends the predicate part of the triple pattern with the symbol @ when it represents a value-based predicate (structural predicates are not prepended with this symbol). The following are two exemplary triple patterns that illustrate this differentiation between value-based and structural predicates:

T1-->?Person affiliatedBy UNSW.
T2-->?Person @age 42.

The triple pattern T1 represents a structural predicate specifying that the nodes represented by the variable ?Person are connected by an affiliatedBy edge to a node that is labeled with an attribute having a value of UNSW. In contrast, the triple pattern T2 represents a value-based predicate that specifies a condition where the nodes represented by the variable ?Person are labeled with an age attribute having a value of 42.

Unlike the RDF graph data model, the attributed graph data model allows each of the edges in an attributed graph to be labeled with an arbitrary set of one or more attributes. Therefore, G-SPARQL is able to differentiate between the representations of two different types of value-based predicates, namely node predicates and edge predicates. A node predicate specifies a condition on the attributes of a node in an attributed graph. An edge predicate specifies a condition on the attributes of an edge in the attributed graph. G-SPARQL uses the standard triple pattern to represent value-based predicates. G-SPARQL can assign a variable to an edge which is to be qualified with more predicates. The following are two exemplary triple patterns that show predicates on node and edge attributes:

T3-->?Person ?E(affiliatedBy) UNSW.
T4-->?E @Role "Professor".
T5-->?Person @officeNumber 518.

The triple pattern T3 represents a structural predicate that specifies a condition where the nodes represented by the variable ?Person are connected by an affiliatedBy relationship to a node that is labeled with an attribute having a value of UNSW. The affiliatedBy edge has an attribute called Role. Therefore, the triple pattern T4 represents an edge predicate that specifies a condition where the Role attribute of the affiliatedBy relationship (where the edge representing this relationship is bound to the variable ?E) has a value of Professor. The Person node has an attribute called officeNumber. The triple pattern T5 represents a node predicate that specifies a condition where Person is labeled with an officeNumber attribute having a value of 518.

1.2.2 Querying Path Patterns Using G-SPARQL

G-SPARQL supports the ability to express arbitrary length paths and path patterns in two main ways. The first way is by using explicit relationships. The following are two exemplary triple patterns that illustrate this use of explicit relationships:

T6-->?Person knows+John.
T7-->?Person knows+?X.

The triple pattern T6 represents a structural predicate that specifies a reachability test condition verifying that the nodes assigned to ?Person are connected by any path of knows edges to a node that is labeled John. The symbol + specifies that the path can have any length greater than one, where each of the edges in the path needs to represent the knows relationship. The triple pattern T7 assigns to the variable ?X all of the nodes that can be reached, through any path of knows edges, from the nodes represented by the variable ?Person.

The second way G-SPARQL supports the ability to express arbitrary length paths and path patterns is by allowing path variables in the predicate part of a triple pattern. More particularly, G-SPARQL supports various options for binding path variables in a path pattern. The following are four exemplary triple patterns that illustrate these options:

T8-->subject ??P object.
T9-->subject ?*P object.
T10-->subject ??P(predicate) object.
T11-->subject ?*P(predicate) object.

The triple pattern T8 binds the path variable ??P to the connecting paths between the subject node and the object node. The symbol ?? specifies that the matching paths between the subject node and the object node can have any arbitrary length. In the triple pattern T9 the symbol ?* specifies that the variable ??P will be matched with the shortest path between the subject node and the object node. The triple pattern T10 ensures that each of the edges in the matching paths represents the specified relationship predicate. Similarly, the triple pattern T11 ensures that each of the edges in the matched shortest path represents the relationship predicate.

Generally speaking, it will be appreciated that any two nodes in an attributed graph can be connected by a plurality of different paths. Accordingly, G-SPARQL allows for the expression of filtering conditions that can specify Boolean predicates on the nodes and edges of the matching paths which are bound to the path variable. More particularly, G-SPARQL supports various filtering conditions on the nodes and edges of the matching paths including, but not limited to, a Length(PV, P) filtering condition, an AtLeastNode(PV, N, P) filtering condition, an AtMostNode(PV, N, P) filtering condition, an AllNodes(PV, P) filtering condition, an AtLeastEdge(PV, N, P) filtering condition, an AtMostEdge(PV, N, P) filtering condition, and an AllEdges(PV, P) filtering condition. Each of these filtering conditions will now be described in more detail.

The Length(PV, P) filtering condition verifies that the length (e.g., the number of edges) of each of the matching paths which is bound to the variable PV satisfies the predicate P and filters out those paths which do not satisfy the predicate P. By way of example but not limitation, the path filtering condition FilterPath (Length(??X, <4)) ensures that the length of each of the paths which is bound to the path variable ??X is less than four edges. The AtMostNode(PV, N, P) filtering condition ensures that at most N number of nodes on each of the paths which is bound to the variable PV satisfy the structural/value-based predicate P. The AllNodes(PV, P) filtering condition ensures that every node of each of the paths which is bound to the variable PV satisfies the structural/value-based predicate P.

The AtLeastNode(PV, N, P) filtering condition verifies if at least N number of nodes on each of the paths which is bound to the variable PV satisfies the predicate P and filters out those paths which do not satisfy the predicate P. It is noted that this predicate can be either a structural predicate or a value-based predicate. By way of example but not limitation, the AtLeastNode(??X, 2, livesIn Sydney) filtering condition ensures that at least two nodes of each of the paths which is bound to the variable ??X satisfy the structural predicate of being connected by the livesIn relationship to a node that is labeled with an attribute having a value of Sydney. The AtLeastNode(??X, 1, @affiliated UNSW) filtering condition ensures that at least one node of each of the paths which is bound to the variable ??X satisfies the value-based predicate of the affiliated attribute having a value of UNSW.

The AtLeastEdge(PV, N, P) filtering condition ensures that at least N number of edges on each of the paths which is bound to the variable PV satisfy the value-based predicate P (it is noted that structural predicates may not be represented for edges). The AtMostEdge(PV, N, P) filtering condition ensures that at most N number of edges on each of the paths which is bound to the variable PV satisfy the value-based predicate P. The AllEdges(PV, P) filtering condition ensures that at every edge of each of the paths which is bound to the variable PV satisfies the value-based predicate P.

It will be appreciated that the foregoing filtering conditions are exemplary and various other filtering conditions are also possible.

1.3 Query Execution Engines

As is appreciated in the art of database systems, relational database systems are generally efficient in executing queries that benefit from indexing (e.g., B-tree) and query optimization techniques (e.g., selectivity estimation and join ordering). By way of example but not limitation, by applying predicates, relational indices can limit the data that needs to be accessed to just those rows that satisfy the predicates. Additionally, index-only access can be used to evaluate and answer relational database queries, thus eliminating the need to access the data pages by providing all the columns that are involved in the query processing. However, relational database systems are inefficient in processing queries that involve looping or recursive access to a large number of records by executing a plurality of performance-expensive join operators which may yield a large intermediate result. Hence, executing traversal operations over a graph (or a portion thereof) that is stored in a relational database system can be time-inefficient due to the large number of potential joins and the performance-cost of having to retrieve the target nodes from the secondary storage device on which the graph (or the portion thereof) is stored.

Generally speaking and as is appreciated in the arts of graph databases and graph query processing, various types of engines exist for executing graph queries, where each different type of engine can be used to execute a certain class of graph queries. By way of example but not limitation, various relational database engines (also known as relational database management systems) exist which can be used to execute pattern matching graph queries. Such relational database engines are commonly implemented in the form of an SQL (Structured Query Language) server. Exemplary relational database engines include the conventional SPARQL engines, Microsoft SQL Server® (a registered trademark of Microsoft Corporation), International Business Machines DB2, and Oracle database systems, among others. Various graph engines also exist which can be used to execute reachability and shortest path graph queries. Exemplary graph engines include the conventional Neo4j graph database, HyperGraphDB, Virtuoso, DEX, and AllegroGraph, among others.

As will be described in more detail hereafter, the graph query processing technique embodiments described herein can use a plurality of independent query execution engines to respond to a given graph query that is submitted by an entity to a graph database which is modeled by an attributed graph. These query execution engines can include either one or more relational database engines, or one or more graph engines, or one or more hybrid engines (which will be described in more detail hereafter). The query execution engines can also include any combination of relational database engines, graph engines and hybrid engines. More particularly and by way of example but not limitation, the query execution engines can include one or more relational database engines and one or more graph engines. The query execution engines can also include one or more relational database engines and one or more hybrid engines. The query execution engines can also include one or more graph engines and one or more hybrid engines. Generally speaking, different parts of the graph query are sent to different ones of the query execution engines for processing. More particularly, and by way of example but not limitation, in an exemplary embodiment of the graph query processing technique embodiments graph query components that involve relationships in the attributed graph (e.g., pattern match components) are sent to either a relational database engine or a relational database component of a hybrid engine for processing, and graph query components that involve the topology of the attributed graph (e.g., reachability and shortest path components) are sent to either a graph engine or a memory-based component of a hybrid engine for processing.

FIG. 3 illustrates an exemplary embodiment, in simplified form, of a hybrid engine implementation of a query execution engine that can be used to execute a part of the graph query. As exemplified in FIG. 3, the hybrid engine 300 includes a memory-based component 302 and a relational database component 304 that uses a secondary storage device. The hybrid engine 300 provides for an efficient hybrid representation of the attributed graph (or of a portion thereof), where the attributed graph (e.g., both its data objects and its topology, among other things) (or the portion thereof) is stored relationally in the relational database component 304, and either part of or the whole of the graph (e.g., the graph topology) is stored natively in main memory. As will be described in more detail hereafter, whenever a given sub-query that is generated for a given graph query component is sent to a given hybrid engine 300 for processing, just the data that is associated with the topology of the attributed graph (or the portion thereof) is retrieved from the relational database system 304 and stored into memory 302. Correspondingly, the graph query processing technique embodiments described herein can employ methods that execute on memory-based 302 data structures to evaluate and answer the parts of the graph query that involve traversal operations on the topology of the attributed graph. Using a relational database system 304 to store the attributed graph (or the portion thereof) is advantageous for various reasons including, but not limited to, the following. Decades' worth of research and development have been put into relational database systems which has resulted in a variety of relational database optimizations such as disk data layout optimizations, indexing and sorting optimizations, buffer management optimizations, and query optimizations, among others. The graph query processing technique embodiments leverage these various optimizations. In addition, the main memory representation of the graph allows fast execution of several operations, such as traversal operations, among others.

Referring again to FIG. 3 and as is appreciated in the art of database systems, various approaches can be used to relationally store the attributed graph (or the portion thereof) in the relational database component 304. By way of example but not limitation, the conventional fully decomposed storage model (DSM) can be used to store the attributed graph (or the portion thereof) in the relational database component 304. This is advantageous for various reasons including, but not limited to, the following. DSM is agnostic to the attributed graph schema and thus can be applied to any attributed graph having any schema. DSM also permits efficient attribute retrieval during the graph query processing by significantly reducing the relational database accesses since just the records of the tables of the particular attributes/relationships that are involved in the graph query will be processed.

Figure 4:
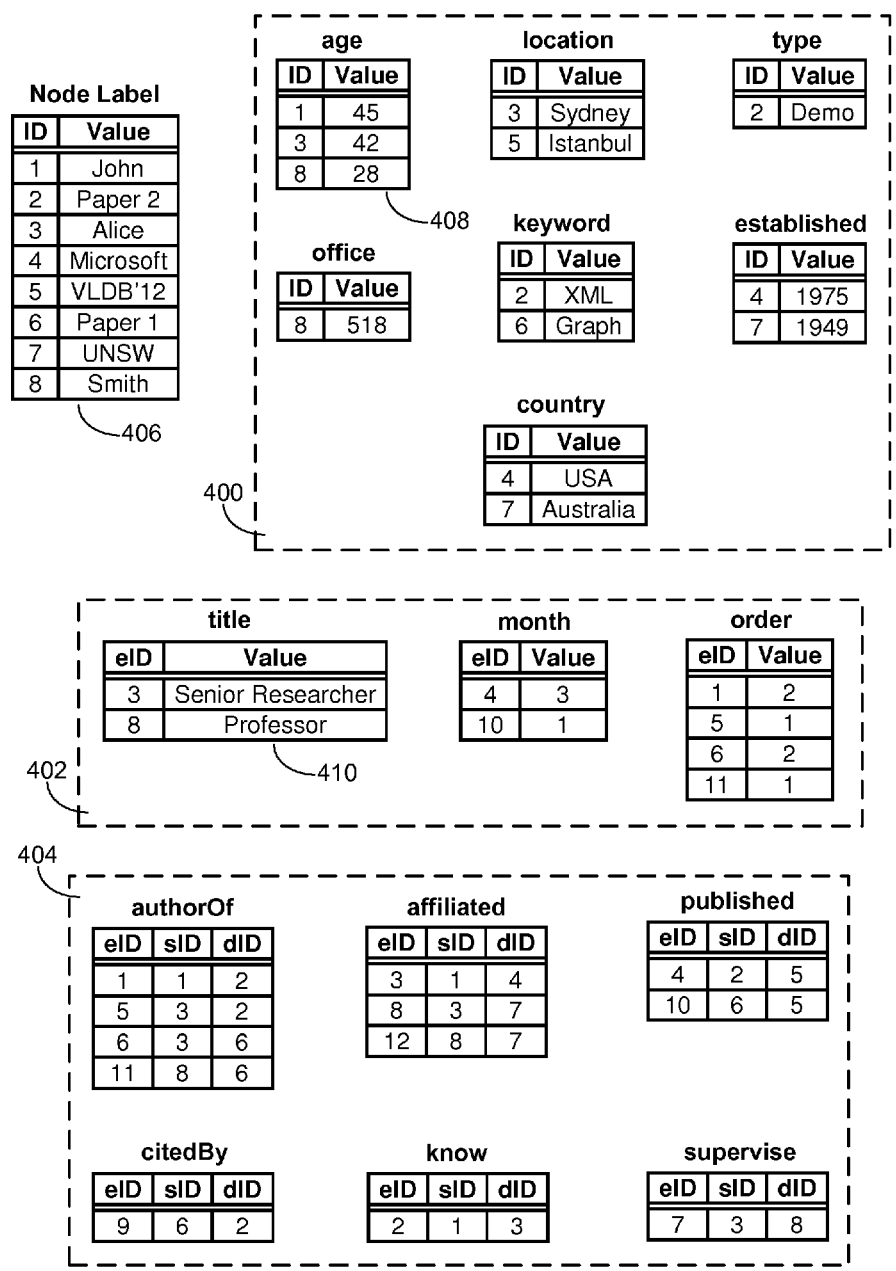
FIG. 4 is a diagram illustrating an exemplary embodiment, in simplified form, of a relational representation of the snippet of the attributed graph that is illustrated in FIG. 1.

FIG. 4 illustrates an exemplary embodiment, in simplified form, of a relational representation of the snippet of the attributed graph that is illustrated in FIG. 1. As exemplified in FIG. 4, a node identifier (ID) is assigned to each of the nodes in the graph snippet in a Node Label table 406. The attributes of the nodes are stored in M two-column tables 400, where M is the number of different attributes of the nodes in the graph snippet (M is seven in the illustrated case). The first column (ID) of a given two-column node attribute table 400 stores the identifiers of each of the nodes that is labeled with the associated attribute, and the second column (Value) of this table stores the value of this attribute for each of these nodes. By way of example but not limitation and as exemplified in FIG. 4, the node in the graph snippet labeled "Alice" is assigned an ID of 3 in the Node Label table 406, and the age attribute for this node is stored in row (3, 42) of an age table 408. The nodes that are not labeled with a particular attribute will simply not have a representative record in the node attribute table which is associated with this attribute. A node attribute that has a plurality of values will be represented with a plurality of rows (each having the same ID value) in the node attribute table which is associated with this attribute. Each of the M two-column tables 400 can be sorted as a clustered index on the ID column which enables fast execution for merge joins when more than one attribute of the same node has to be retrieved. Additionally, a secondary partitioned B-tree index on the Value column can be created for each of the M two-column tables 400 which enables fast execution for value-based predicates on the attributes by minimizing the performance-cost of accessing the relational database to retrieve those nodes that satisfy a predicate condition.

Referring again to FIG. 4, an edge identifier (eID) is assigned to each of the edges in the snippet of the attributed graph that is illustrated in FIG. 1. The attributes of the edges are stored in N two-column tables 402, where N is the number of different attributes of the edges in the graph snippet (N is three in the illustrated case). The first column (eID) of a given two-column edge attribute table 402 stores the identifiers of each of the edges that is labeled with the associated attribute, and the second column (Value) of this table stores the value of this attribute for each of these edges. By way of example but not limitation and as exemplified in FIG. 4, the edge in the graph snippet labeled "affiliated" that connects the node labeled "John" to the node labeled "Microsoft" is assigned an eID of 3, and the title attribute for this edge is stored in row (3, Senior Researcher) of a title table 410. The edges that are not labeled with a particular attribute will simply not have a representative record in the edge attribute table which is associated with this attribute. An edge attribute that has a plurality of values will be represented with a plurality of rows (each having the same eID value) in the edge attribute table which is associated with this attribute. Each of the N two-column tables 402 can be sorted as a clustered index on the eID column which enables fast execution for merge joins when more than one attribute of the same edge has to be retrieved. Additionally, a secondary partitioned B-tree index on the Value column can be created for each of the N two-column tables 402 which enables fast execution for value-based predicates on the attributes by minimizing the performance-cost of accessing the relational database to retrieve those nodes that satisfy a predicate condition.

Referring again to FIG. 4, the edges in the snippet of the attributed graph that is illustrated in FIG. 1 are stored in P three-column tables 404, where P is the number of different relationships that exist between the nodes in the graph snippet (P is six in the illustrated case). These P three-column tables 404 store the topology of the graph snippet (e.g., data representing the structure of the nodes and edges in the graph snippet) in the following manner. Each of the P three-column tables 404 groups the data of all the edges that represent a particular relationship. Each of the edges is described by three pieces of data, namely the edge identifier (eID), the identifier of the source node (sID) that the edge is connected to, and the identifier of the destination node (dID) that the edge is connected to.

Referring again to FIGS. 3 and 4, it will be appreciated that the memory-based representation of the topology of the attributed graph 302 can be implemented in various ways. By way of example but not limitation, a native, pointer-based data structure can be employed to represent the topology of the attributed graph in memory 302. More particularly, the memory-based representation of the topology of the attributed graph 302 can encode the data in the P three-column tables 404, which in principle represents the data that is used during the processing of the reachability and shortest path components of a graph query which can involve heavy transversal operations on the topology of the graph. As will be described in more detail hereafter, such traversal operations can be performed using various methods such as the conventional Dijkstra method for obtaining the shortest path between two nodes, and the conventional breadth-first search (BFS) method, among others.

Given the foregoing, it will be appreciated that the hybrid relational representation of an attributed graph that is provided for by the hybrid engine substantially reduces main memory consumption in the following ways. First, the attributes of the nodes and edges in the attributed graph, and the data values of these attributes, do not have to be loaded into the memory unless needed in a query. Second, extra memory indices for these attributes do not have to be built outside the hybrid engine's relational database component since the graph query processing technique embodiments described herein send the evaluation of the graph query predicates to the relational database component for processing, and the relational database component chooses to build its efficient indexes to accelerate the query evaluation.

1.4 Graph Query Processing

Figure 5:
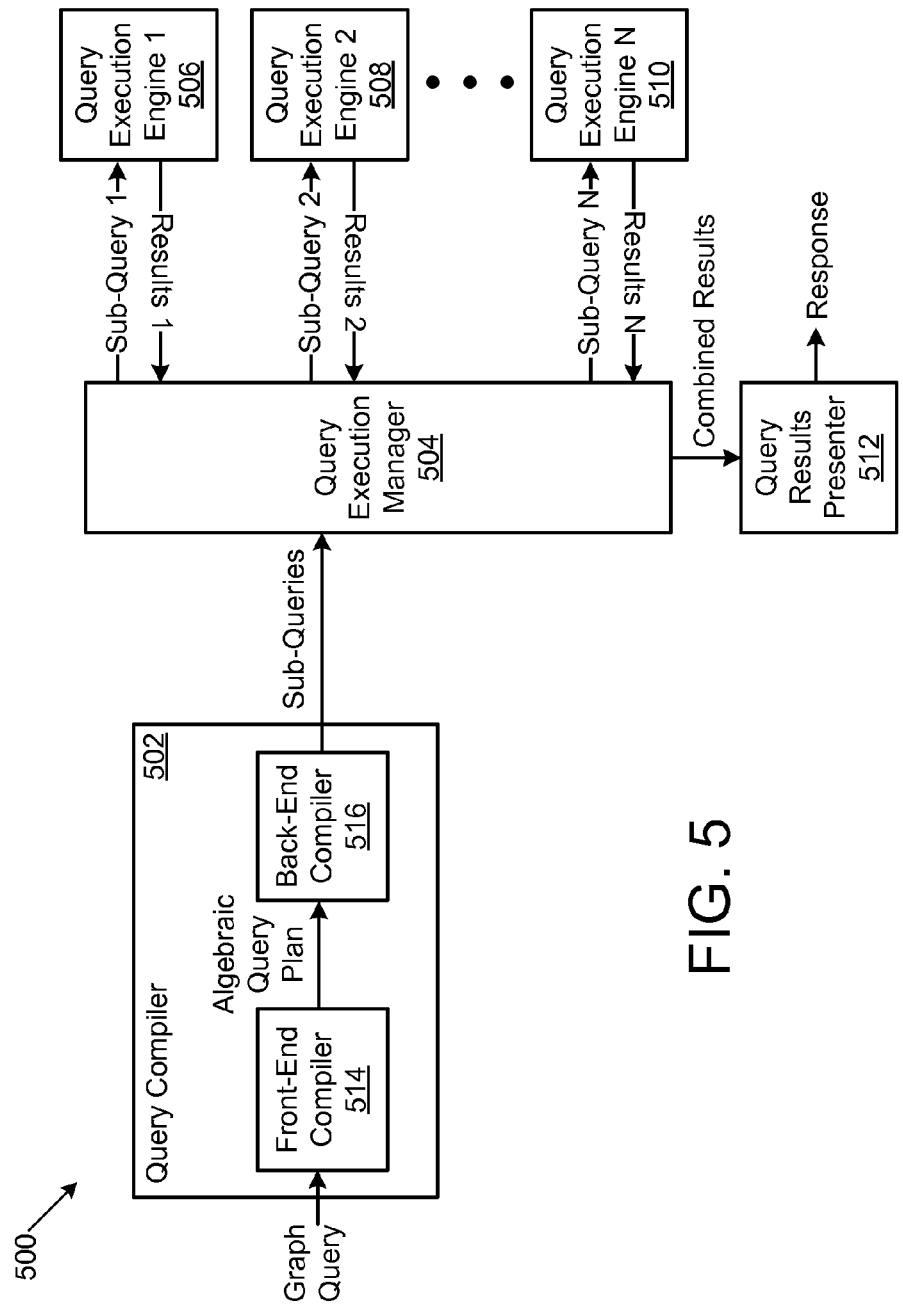
FIG. 5 is a diagram illustrating an exemplary embodiment, in simplified form, of an architectural framework for implementing the graph query processing technique embodiments described herein.

FIG. 5 illustrates an exemplary embodiment, in simplified form, of an architectural framework for implementing the graph query processing technique embodiments described herein. In other words, FIG. 5 exemplifies an architectural framework 500 for responding to G-SPARQL queries that are submitted by an entity to a graph database which is modeled by an attributed graph. The architectural framework 500 exemplified in FIG. 5 includes a query compiler 502, a query execution manager 504, a plurality of independent query execution engines 506/508/510, and a query results presenter 512. Generally speaking and as will be described in more detail hereafter, the query compiler 502 decomposes the G-SPARQL query into one or more query components and generates one or more sub-queries that represent the decomposed query components, where the sub-queries can be processed by different ones of the plurality of independent query execution engines 506/508/510.

Referring again to FIG. 5, it will be appreciated that the query compiler 502 can be implemented in various ways. By way of example but not limitation and as exemplified in FIG. 5, the query compiler 502 can include a front-end compiler 514 and a back-end compiler 516. Generally speaking and as will be described in more detail hereafter, the front-end compiler 514 translates the G-SPARQL query into an algebraic query plan that includes a plurality of algebraic operators (such as relational operators and reachability operators, among others), and serves as an abstract intermediate language which represents the G-SPARQL query. The front-end compiler 514 uses a dialect of tuple-based algebra to perform this translation. This tuple-based algebra includes a set of algebraic operators each of which considers tuples as the main unit of information, and each of which manipulates collections of tuples. The set of algebraic operators that is employed by the front-end compiler 514 includes a collection of different conventional relational operators (e.g., selection, projection, join) and also includes a collection of different non-conventional graph operators that are capable of expressing complex graph query operations that cannot be matched with the semantics of the relational operators (e.g., cannot be expressed by the relational operators).

Referring again to FIG. 5, the back-end compiler 516 generally translates the algebraic query plan into a plurality of sub-queries that represent the query components of the G-SPARQL query. More particularly and as will be described in more detail hereafter, the back-end compiler 516 analyzes the algebraic operators of the algebraic query plan and translates these algebraic operators into either SQL sub-queries or non-relational sub-queries. The back-end compiler 516 generates SQL sub-queries for the algebraic operators of the algebraic query plan that are associated with relational operations in the attributed graph (e.g., the algebraic operators that are associated with the aforementioned pattern match component of the G-SPARQL query). The back-end compiler 516 generates non-relational sub-queries for the algebraic operators of the algebraic query plan that are associated with traversal operations in the attributed graph (e.g., the algebraic operators that are associated with the aforementioned reachability and shortest path components of the G-SPARQL query). Since the algebraic query plan is based on tuples, the back-end compiler 516 is able to leverage various conventional and well-established relational query planning and optimization methods during the sub-query generation.

Generally speaking and referring again to FIG. 5, the query execution manager 504 serves to abstract the independent query execution engines 504/506/508. More particularly and as will be described in more detail hereafter, the query execution manager uses a knowledge of which of the plurality of independent query execution engines are currently available and the characteristics of each of the available query execution engines (e.g., its application programming interface (API), the type(s) of query it can efficiently execute, the cost to use it, and data availability, among other things), along with one or more engine selection rules, to identify a one of the query execution engines that is to be used to process each of the query components (e.g., the sub-query that represents each of the query components). In one embodiment of the graph query processing technique described herein, for each of the query components the query execution manager then sends the sub-query that represents the query component to the identified query execution engine for processing and receives corresponding results from this identified engine. Assuming the results received are sufficient to answer the graph query, the query execution manager then combines the results received and sends them to the query results presenter 512. The query results presenter 512 then uses the combined results received to generate a response to the graph query, and presents the response to the entity that submitted the graph query. A situation where the results for a one or more of the sub-queries are needed to execute another one or more of the sub-queries is described in more detail hereafter.

Generally speaking and referring again to FIG. 5, the architectural framework 500 can be either implemented on a single computing device, or implemented on a plurality of different computing devices. More particularly, and by way of example but not limitation, in a unified embodiment of the graph query processing technique described herein the entire framework 500 can be implemented on a single computing device. In a distributed embodiment of the graph query processing technique, each of the different elements 500-516 of the framework 500 can be implemented on a different computing device and these different computing devices can be interconnected via a data communication network. As such, it will be appreciated that the graph query processing technique embodiments support the querying of a large attributed graph where different parts or components of the attributed graph are stored on different computing devices each of which has its own independent query execution engine that processes queries/sub-queries which are sent thereto.

A more detailed description of the set of algebraic operators, the front-end compiler that uses these operators, the back-end compiler, and the query execution manager will be provided hereafter. As will be appreciated from the more detailed description that follows, the set of algebraic operators, the front-end compiler, the back-end compiler, and the query execution manager are advantageous since they are independent of the specific representation of the attributed graph that is employed in each of the query execution engines.

Figure 6:
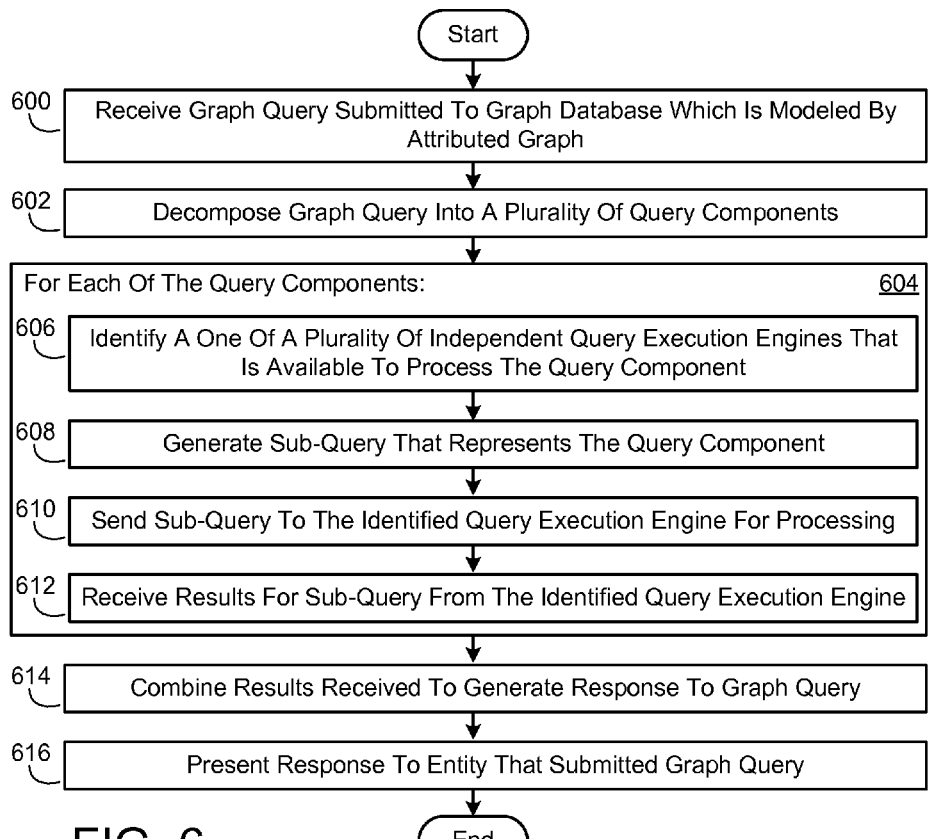
FIG. 6 is a flow diagram illustrating one embodiment, in simplified form, of a process for responding to graph queries.

FIG. 6 illustrates one embodiment, in simplified form, of a process for responding to graph queries. As exemplified in FIG. 6, the process starts in block 600 with receiving a graph query that is submitted to a graph database which is modeled by an attributed graph. The graph query is then decomposed into a plurality of query components (block 602). The following actions then take place for each of the query components (block 604). A one of a plurality of independent query execution engines that is available to process the query component is identified (block 606). A sub-query is then generated that represents the query component (block 608). The sub-query is then sent to the identified query execution engine for processing (block 610). Results for the sub-query are then received from the identified query execution engine (block 612). Assuming the results received are sufficient to answer the graph query, the results received are then combined to generate a response to the graph query (block 614), and the response is presented to the entity that submitted the graph query (block 616). It is noted that the sub-queries can be executed in parallel among the different identified query execution engines.

Figure 16:
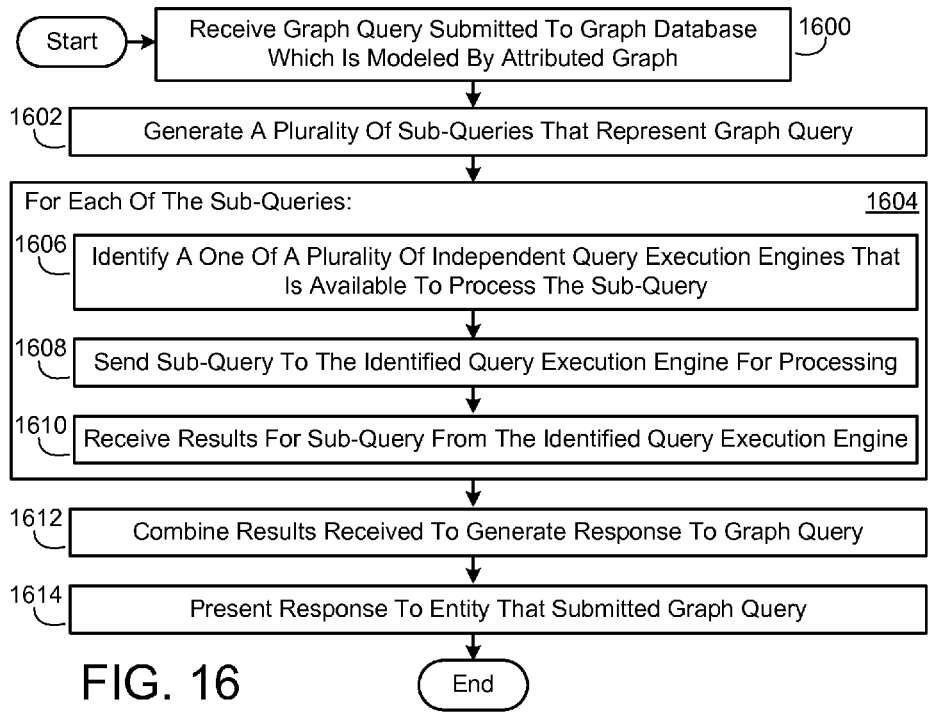
FIG. 16 is a flow diagram illustrating another embodiment, in simplified form, of a process for responding to graph queries.

FIG. 16 illustrates another embodiment, in simplified form, of a process for responding to graph queries. As exemplified in FIG. 16, the process starts in block 1600 with receiving a graph query that is submitted to a graph database which is modeled by an attributed graph. A plurality of sub-queries that represent the graph query is then generated (block 1602). The following actions then take place for each of the sub-queries (block 1604). A one of a plurality of independent query execution engines that is available to process the sub-query is identified (block 1606). The sub-query is then sent to the identified query execution engine for processing (block 1608). Results for the sub-query are then received from the identified query execution engine (block 1610). Assuming the results received are sufficient to answer the graph query, the results received are then combined to generate a response to the graph query (block 1612), and the response is presented to the entity that submitted the graph query (block 1614).

1.4.1 G-SPARQL Algebraic Operators

FIG. 7 illustrates an exemplary embodiment of the set of algebraic operators that can be used in G-SPARQL. Generally speaking and as described heretofore, these algebraic operators are independent of the specific representation of the attributed graph that is employed in each of the query execution engines. Triple patterns are the main constructs of building G-SPARQL queries, where each of the triple pattern variables in each of the G-SPARQL queries is replaced by matching elements from the attributed graph that is being queried. The graph query processing technique embodiments described herein generate a set of variable bindings (e.g., a mapping from variable names to values) for each of the G-SPARQL queries. Shared variable names are represented as join equality predicates in the algebraic query plan that is generated for a given G-SPARQL query. As exemplified in FIG. 7, G-SPARQL supports various algebraic operators including, but not limited to, an NgetAttVal operator, an EgetAttVal operator, a getEdgeNodes operator, a strucPred operator, an edgeJoin operator, a pathJoin operator, an sPath- Join operator, and a filterPath operator. Each of these algebraic operators will now be described in more detail.

Figure 8A:
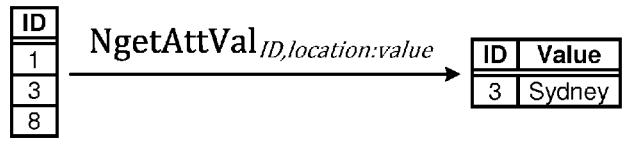
FIGS. 8A-8P are diagrams illustrating exemplary embodiments, in simplified form, of the behavior of the algebraic operators illustrated in FIG. 7 based on the snippet of the attributed graph that is illustrated in FIG. 1 and its corresponding relational representation that is illustrated in FIG. 4.

Referring again to FIG. 7, the NgetAttVal operator is a unary operator that is used to retrieve the values of a specific attribute for a given set of nodes in an attributed graph. The NgetAttVal operator receives a set of tuples {ID, (attName): ID, value} where the ID column of the input relation identifies the nodes in the attributed graph, and also identifies the name (attName) of the attribute in the graph to be accessed. The schema of the output tuples extends the schema of the input tuples with the value column that represents the values of the accessed attribute. Based on the snippet of the attributed graph that is illustrated in FIG. 1 and its corresponding relational representation that is illustrated in FIG. 4, FIG. 8A illustrates an exemplary embodiment, in simplified form, of the behavior of the NgetAttVal operator when it retrieves the values of a "location" attribute for an input relation having a three node ID of ("John", "Alice", "Smith"). As exemplified in FIG. 8A, the output relation includes just one record (for the "Alice" node) that has the "location" attribute, and this attribute has a value of "Sydney". The "John" and "Smith" nodes are filtered out because they do not have values for the "location" attribute.

Figure 8B:
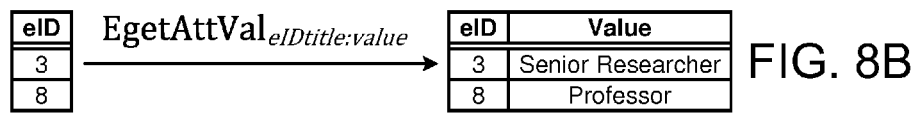

The EgetAttVal operator is another unary operator that is used to retrieve the values of a specific attribute for a given set of edges in an attributed graph. The EgetAttVal operator receives a set of tuples {eID, (attName): eID, value} where the eID column of the input relation identifies the edges in the attributed graph, and also identifies the name (attName) of the attribute in the graph to be accessed. The schema of the output tuples extends the schema of the input tuples with the value column that represents the values of the accessed attribute. Based on the snippet of the attributed graph that is illustrated in FIG. 1 and its corresponding relational representation that is illustrated in FIG. 4, FIG. 8B illustrates an exemplary embodiment, in simplified form, of the behavior of the EgetAttVal operator when it retrieves the values of a "title" attribute for an input relation having an eID of two edges. As exemplified in FIG. 8B, the schema of the output relation extends the schema of the input relation with an attribute that stores the value of the accessed attribute.

Figure 8C:
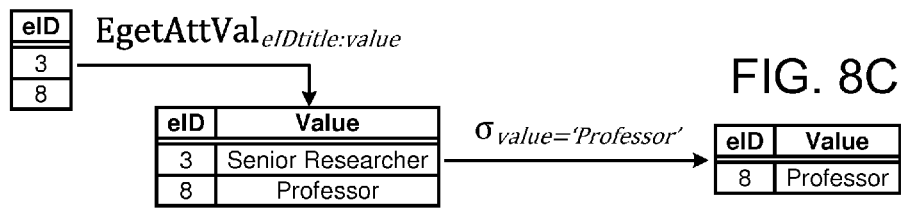

It is noted that the conventional relational selection operator $\sigma_p$ can be used for representing value-based predicates p over the values of the attributes of nodes or edges in an attributed graph. When used in this manner, $\sigma_p$ selects just the tuples of an input relation for which the value-based predicate p over a specific column holds. It will thus be appreciated that using $\sigma_p$ in this manner is advantageous in that it represents the right match for reflecting the expressivity of the SPARQL FILTER expression. FIG. 8C illustrates an exemplary embodiment, in simplified form, of an extension of the behavior exemplified in FIG. 8B where $\sigma_p$ is used to filter the input edges based on the predicate title="Professor" for the retrieved values of the "title" attribute.

Figure 8D:
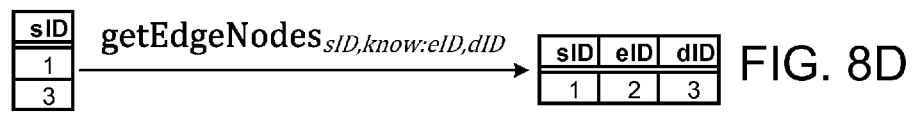
Figure 8E:
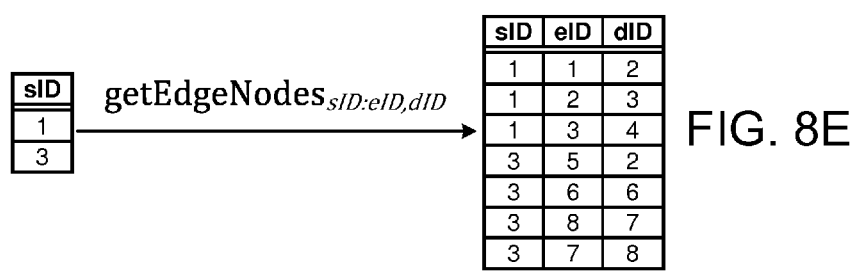

Referring again to FIG. 7, the getEdgeNodes operator is another unary operator that is used to retrieve a set of adjacent nodes in an attributed graph. The getEdgeNodes operator receives a set of tuples {sID, [(eLabel)]: sID, eID, dID} where the sID column of the input relation identifies the nodes in the attributed graph, and can optionally also identify a specified relation for accessing the adjacent nodes (eLabel). The schema of the output tuples extends the schema of the input tuples with the two columns that represent the identifier eID of the connecting edges of the specified relation and the identifier dID of the adjacent node. In the case where the getEdgeNodes operator receives the eLabel parameter, then the getEdgeNodes operator filters out the nodes that do not have adjacent nodes connected with the specified relationship. Based on the snippet of the attributed graph that is illustrated in FIG. 1 and its corresponding relational representation that is illustrated in FIG. 4, FIG. 8D illustrates an exemplary embodiment, in simplified form, of the behavior of the getEdgeNodes operator when it retrieves the adjacent nodes that are connected through a "know" relationship for an input relation having a two node sID of ("John", "Alice"). As exemplified in FIG. 8D, the output relation filters out the "Alice" node since it is not connected to any other node through the "know" relationship. FIG. 8E illustrates an exemplary embodiment, in simplified form, of the behavior of the getEdgeNodes operator when it retrieves all the adjacent nodes for an input relation having a two node sID of ("John", "Alice").

Figure 8F:
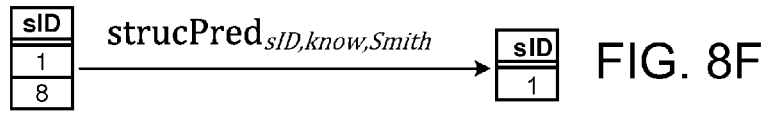
Figure 8G:
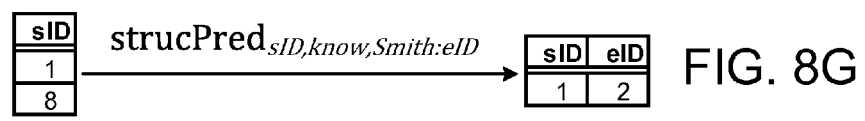

Referring again to FIG. 7, the strucPred operator is a unary operator that is used to filter a given set of nodes in an attributed graph based on a specific structural predicate. The strucPred operator receives a set of tuples {sID, (eLabel), (dNLabel): sID, [eID]} where the sID column of the input relation identifies the nodes in the attributed graph, and also identifies a structural predicate that is described by the label of the connecting relation (eLabel), and also identifies a label for the adjacent node (dNLabel) that is to be accessed through this relation. Based on the snippet of the attributed graph that is illustrated in FIG. 1 and its corresponding relational representation that is illustrated in FIG. 4, FIG. 8F illustrates an exemplary embodiment, in simplified form, of the behavior of the strucPred operator when it applies a structural predicate that filters out the nodes that are not connected to an adjacent node having the label "Smith" through a "know" relationship. FIG. 8G illustrates an exemplary embodiment, in simplified form, of the behavior of the strucPred operator when it projects the data of the connecting edges that represent the structural predicate. In this particular embodiment the schema of the output relation is extended with an additional column that stores the eID of the connecting edges.

Figure 8H:
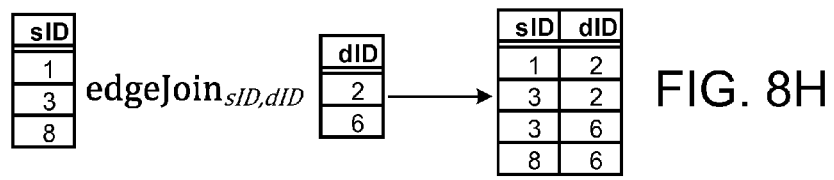

Referring again to FIG. 7, the edgeJoin operator is a binary join operator that receives two relations (S and D) where the two columns sID and dID identify the nodes of S and D, respectively, in an attributed graph. For each of the pairs of nodes in the attributed graph, the edgeJoin operator checks whether the pair is connected with any edge in the attributed graph, filters out the unconnected pairs of nodes, and returns the tuples of the connected pairs of nodes as a result. The output of the edgeJoin operator is a single relation where the schema of the output tuples concatenates the columns of S and D. Based on the snippet of the attributed graph that is illustrated in FIG. 1 and its corresponding relational representation that is illustrated in FIG. 4, FIG. 8H illustrates an exemplary embodiment, in simplified form, of the behavior of the edgeJoin operator when it receives two sets of nodes, namely ("John", "Alice", "Smith") and ("Paper 2", "Paper 1"), and returns the pairs of nodes that are connected through any relationship.

Figure 8I:
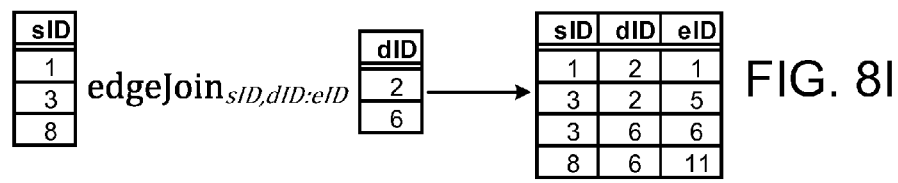
Figure 8J:
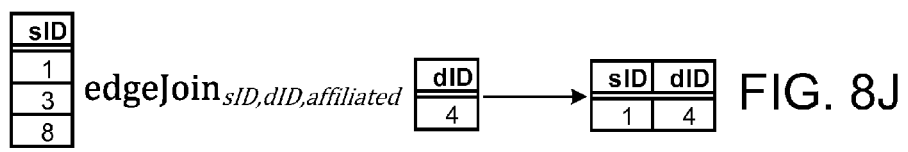
Figure 8K:
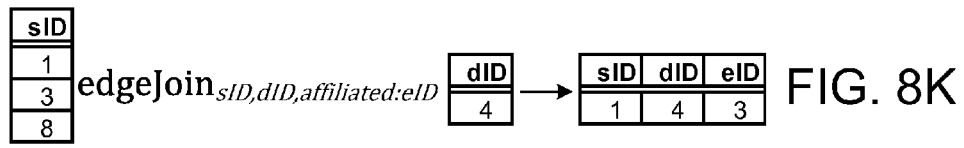

As exemplified in FIG. 7, the edgeJoin operator can also receive an optional parameter eLabel which imposes a specific relationship condition on the connecting edge between each of the pairs of nodes in an attributed graph. Based on the snippet of the attributed graph that is illustrated in FIG. 1 and its corresponding relational representation that is illustrated in FIG. 4, FIG. 8J illustrates an exemplary embodiment, in simplified form, of the behavior of the edgeJoin operator when it receives two sets of nodes, namely ("John", "Alice", "Smith") and ("Microsoft"), and returns the pairs of nodes that are connected through an "affiliated" relationship. The edgeJoin operator can also optionally project the data of the connecting edge(s) where it extends the schema of the output relation by an additional column eID that represents the identifiers of the connecting edges between each of the pairs of nodes in the output tuples according to the specified input parameters. FIGS. 8I and 8K illustrate exemplary embodiments, in simplified form, of this projection feature of the edgeJoin operator. More particularly, FIG. 8I illustrates an exemplary embodiment of the behavior of the edgeJoin operator which is similar to the embodiment illustrated in FIG. 8H except for the fact that the output relations exemplified in FIG. 8I include the eID of the connecting edges between each of the output pairs of nodes. Similarly, FIG. 8K illustrates an exemplary embodiment of the behavior of the edgeJoin operator which is similar to the embodiment illustrated in FIG. 8J except for the fact that the output relations in FIG. 8K include the eID of the connecting edges between each of the output pairs of nodes.

Figure 8L:
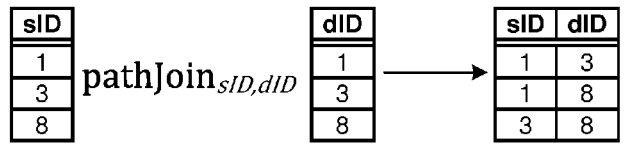

Referring again to FIG. 7, the pathJoin operator is another binary join operator that receives two relations (S and D) where the two columns sID and dID identify the nodes of S and D, respectively, in an attributed graph. For each of the pairs of nodes in the attributed graph, the pathJoin operator checks whether the pair is connected by a sequence of edges in the attributed graph, where this sequence can be of any length, filters out the unconnected pairs of nodes, and returns the tuples of the connected pairs of nodes as a result. Based on the snippet of the attributed graph that is illustrated in FIG. 1 and its corresponding relational representation that is illustrated in FIG. 4, FIG. 8L illustrates an exemplary embodiment, in simplified form, of the behavior of the pathJoin operator when it receives two sets of nodes, namely ("John", "Alice", "Smith") and ("John", "Alice", "Smith"), and returns the pairs of nodes that are connected through a sequence of relationships of any length. The pathJoin operator can also receive an optional parameter eLabel which imposes a specific relationship condition on the edge of the connecting path between each of the pairs of nodes. FIG. 8N illustrates an exemplary embodiment of the pathJoin operator when it receives two sets of nodes, namely ("John", "Alice", "Smith") and ("John", "Alice", "Smith"), and returns the pairs of nodes that are connected through a sequence of "know" relationships of any length.

As exemplified in FIG. 7, the pathJoin operator can also optionally project the data of the connecting path(s) as follows. First, the pathJoin operator can extend the schema of the input relation by an additional column pID that represents an assigned identifier for the connecting path between each of the pairs of nodes specified in operator input. It is noted that each of the pairs of nodes can be connected with a plurality of different paths and as such, each of the input pairs of nodes can have a plurality of different representing tuples which describe the data of the bound paths. Second, the pathJoin operator can return another output relation pRel that describes the data of the resulting paths, where each of the resulting paths is described by a sequence of tuples which represent the nodes and edges that make up the path in an orderly manner, and each of the tuples in this sequence can be described by a plurality of fields including, but not limited to, a pID field that represents the path identifier, a type field that represents whether the tuple describes a node or an edge, an order field that represents the order of the node or edge that participates in the path, an ID field that represents the identifier of the node or edge, and a label field that represents the Label data of the node or edge. In an exemplary embodiment of the graph query processing technique described herein if the tuple describes a node then the type field has a value of 'N', and if the tuple describes an edge then the type field has a value of 'E'. Additionally, the order of each of the paths starts with an edge ordered as one followed by a node ordered as two, and then the order of the path alternates until the last edge of the path is reached. The value of a given path variable in the query output is represented by a serialization of the Label data of the tuples that are associated with the path variable, where this Label data is serialized in ascending order.

Figure 8M:
Figure 8N:
Figure 8O:

FIGS. 8M and 8O illustrate exemplary embodiments, in simplified form, of the just-described projection feature of the pathJoin operator. More particularly, FIG. 8M illustrates an exemplary embodiment of the behavior of the pathJoin operator which is similar to the embodiment illustrated in FIG. 8L except for the fact that the output relations exemplified in FIG. 8M project the data of the resulting connecting paths. Similarly, FIG. 8O illustrates an exemplary embodiment of the behavior of the pathJoin operator which is similar to the embodiment illustrated in FIG. 8N except for the fact that the output relations exemplified in FIG. 8O project the data of the resulting connecting paths.

Referring again to FIG. 7, the sPathJoin operator works in the same way as the pathJoin operator except for the fact that the sPathJoin operator returns the paths that represent the shortest connection between each of the pairs of nodes in an attributed graph, assuming such connections exist.

Figure 8P:
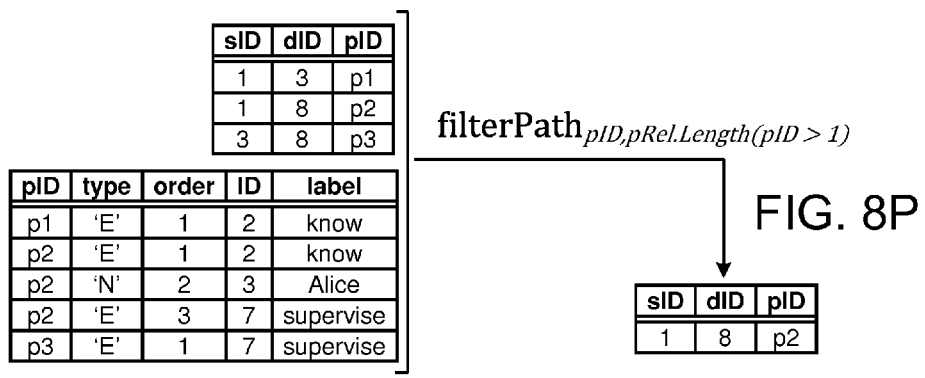

As exemplified in FIG. 7, the filterPath operator is a binary operator that receives two relations (R and pRel) where the pID column of the relation R represents the path identifiers that have their associated description data represented by the relation pRel. The filterPath operator returns the relation R, where the tuples that have paths pID with data pRel which does not fulfill a condition cond are filtered out. The cond parameter represents one of the aforementioned path filtering conditions. Based on the snippet of the attributed graph that is illustrated in FIG. 1 and its corresponding relational representation that is illustrated in FIG. 4, FIG. 8P illustrates an exemplary embodiment, in simplified form, of the behavior of the filterPath operator when it filters a set of paths based on a Length (e.g., number of edges) condition that returns the paths having lengths greater than one, and filters out the rest of the paths.

As indicated in FIG. 7, some of the algebraic operators described heretofore cannot be represented by conventional relational operators. Based on the aforementioned hybrid relational representation of an attributed graph that can be employed by the graph query processing technique embodiments described herein, FIG. 9 illustrates exemplary embodiments of mappings for the algebraic operators that can be translated into a pattern of conventional relational operators. By way of example but not limitation and as exemplified in FIG. 9, the NgetAttVal operator can be mapped to a join operation between the nodeID column of the input relation R and the ID column of the relation that represents the specified node attribute (attName). The NgetAttVal operator extends the schema of the input tuples (R.*) with the value column for the relation of the specified attribute (attName). Since the semantics of the getEdgeNodes and edgeJoin operators can be not restricted by a specified relationship (eLabel), applying these operators using the standard relational operators requires joining the input relation(s) with each of the relation tables, separately, and then performing a union of all the results. Stated more simply, a materialized view (allEdges) can be created that represents a union of all the relation tables.

Figure 10A:
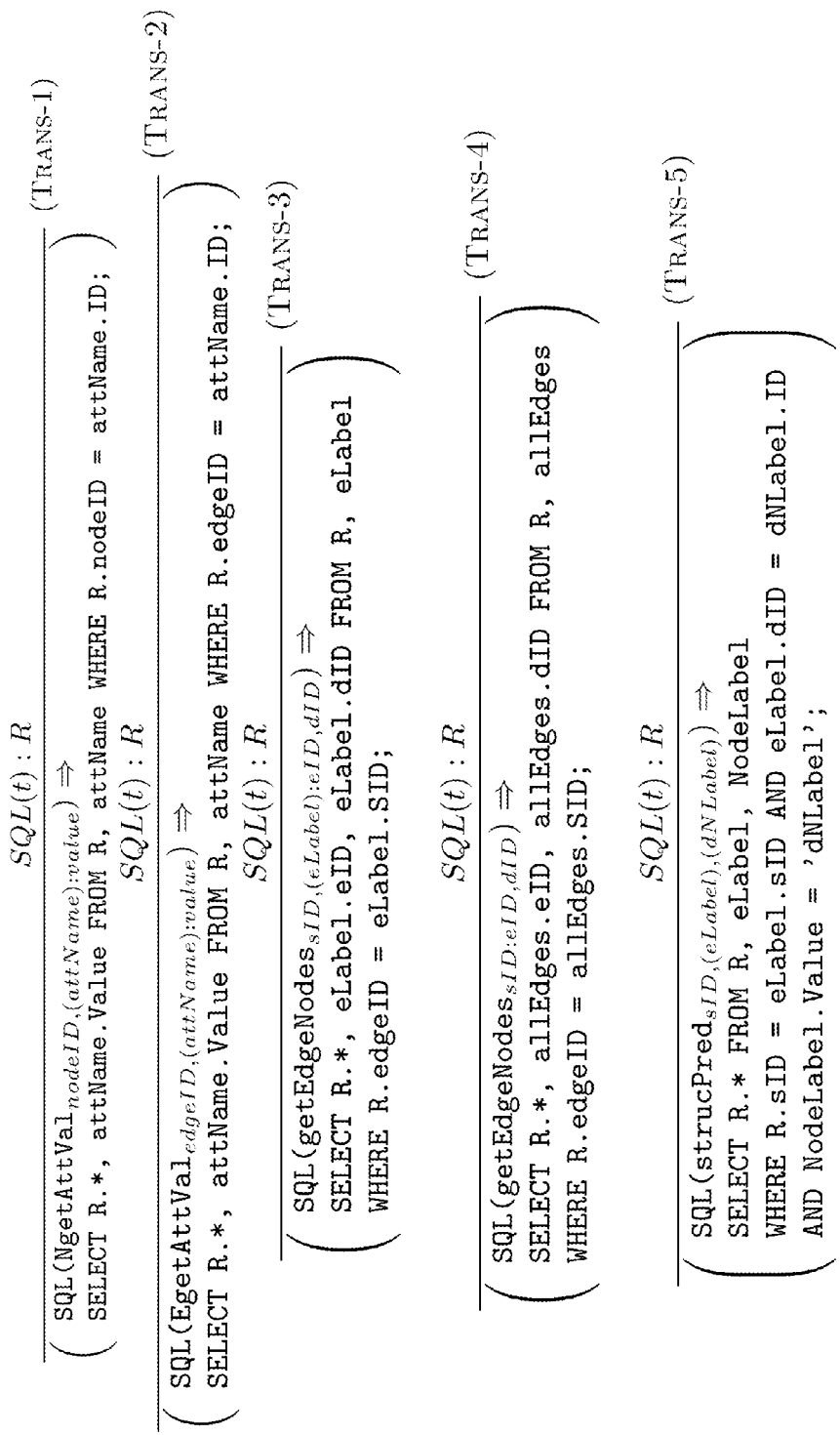

FIGS. 10A and 10B illustrate exemplary embodiments of inference rules for the SQL (Structured Query Language) translation templates of each of the algebraic operators described heretofore. The following is a sample interpretation of the TRANS-1 inference rule shown in FIG. 10A that represents the translation of the NgetAttVal operator. Given that the relation R represents the SQL evaluation of the triple pattern t, the SQL translation of the NgetAttVal$_{nodeID,(attName):value}$ operator can be defined using the following SQL code:

SELECT R.*, attName.Value FROM R, attName
WHERE R.nodeID=attName.ID;

1.4.2 Front-End Compiler

This section provides a more detailed description of the aforementioned exemplary front-end compiler.

Figure 11:
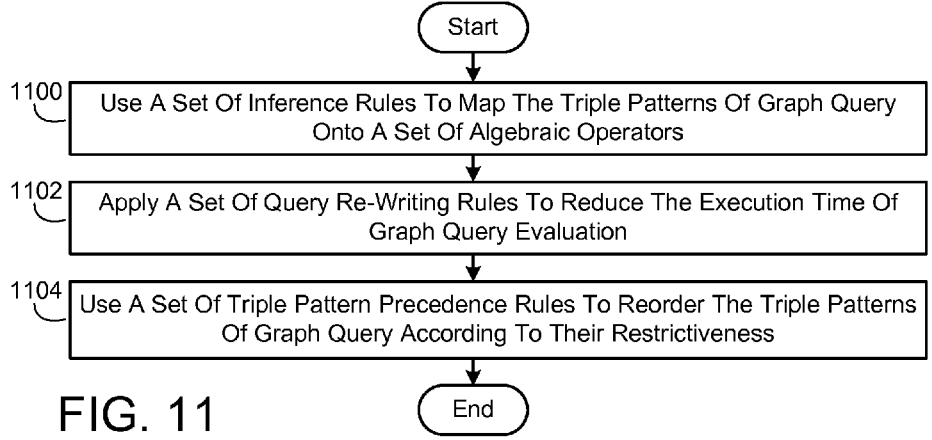
FIG. 11 is a flow diagram illustrating an exemplary embodiment, in simplified form, of a process for using a dialect of tuple-based algebra to translate a graph query into an algebraic query plan.

FIG. 11 illustrates an exemplary embodiment, in simplified form, of a process for using the aforementioned dialect of tuple-based algebra to translate the G-SPARQL query into an algebraic query plan that includes relational and non-relational operators. As exemplified in FIG. 11, the process starts in block 1100 with using a set of inference rules to map the triple patterns of the G-SPARQL query onto the aforementioned set of algebraic operators. FIGS. 12A-12D illustrate exemplary embodiments of such inference rules. The following is a sample interpretation of the OPMAP-1 inference rule shown in FIG. 12A. OPMAP-1 maps a triple pattern (?var, @attName, ?var2) of G-SPARQL query q onto the NgetAttVal$_{ID,(attName):value}$ algebraic operator where the variable ?var2 is bound to the (Col(?var2)=value) column value of the output relation from applying the NgetAttVal operator given that the mapping of the ?var (Map(?var)) variable is bound to the column ID as a part of the input relation R. In the inference rules exemplified in FIGS. 12A-12D Triple(q) refers to the set of triple patterns of a G-SPARQL query q, PathFilter(q) refers to the set of path filters of a G-SPARQL query q, and allEdges (e.g., inference rule OPMAP-8) refers to the materialized view that represents a union of all relation tables.

Referring again to FIG. 11, once the triple patterns of the G-SPARQL query have been mapped onto the set of algebraic operators (block 1100), a set of query re-writing rules is applied in order to reduce the execution time of the G-SPARQL query evaluation (block 1102), where these re-writing rules are specific to the G-SPARQL constructs described herein. Additionally, the triple patterns of the G-SPARQL query are reordered according to their "restrictiveness", where this reordering is performed using the following set of triple pattern precedence rules (block 1104). Given that t1, t2∈Triple(q) denotes two triple patterns of a given G-SPARQL query q, triple pattern t1 is defined as being less restrictive than triple pattern t2 (e.g., t1>>t2) whenever t1 has more path variables (?? or ?*) than t2. Triple pattern t1 is defined as being more restrictive than triple pattern t2 (e.g., t1<<t2) whenever t1 has fewer path variables (?? or ?*) than t2. Triple pattern t1 is also defined as being more restrictive than triple pattern t2 (e.g., t1<<t2) whenever t1 has the same number of path variables (?? or ?*) as t2 and the number of filter expressions over t1's path variables is greater than the number of filter expressions over t2's path variables. In other words, a triple pattern of the G-SPARQL query that is more restrictive is given a higher precedence in order to optimize the join order for the SQL sub-queries that are generated for the G-SPARQL query.

Figure 13A:
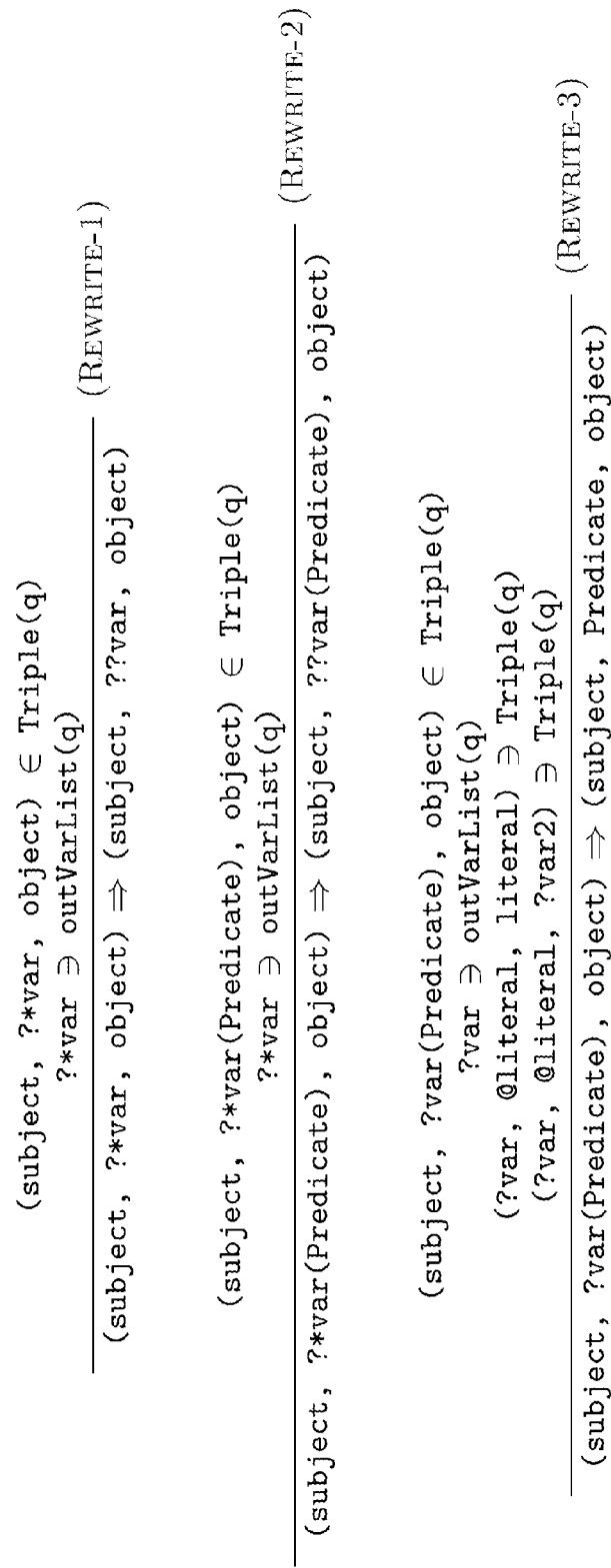
FIGS. 13A and 13B are a listing illustrating an exemplary embodiment of a set of query re-writing rules that can be applied during the front-end compilation of a graph query.
Figure 13B:
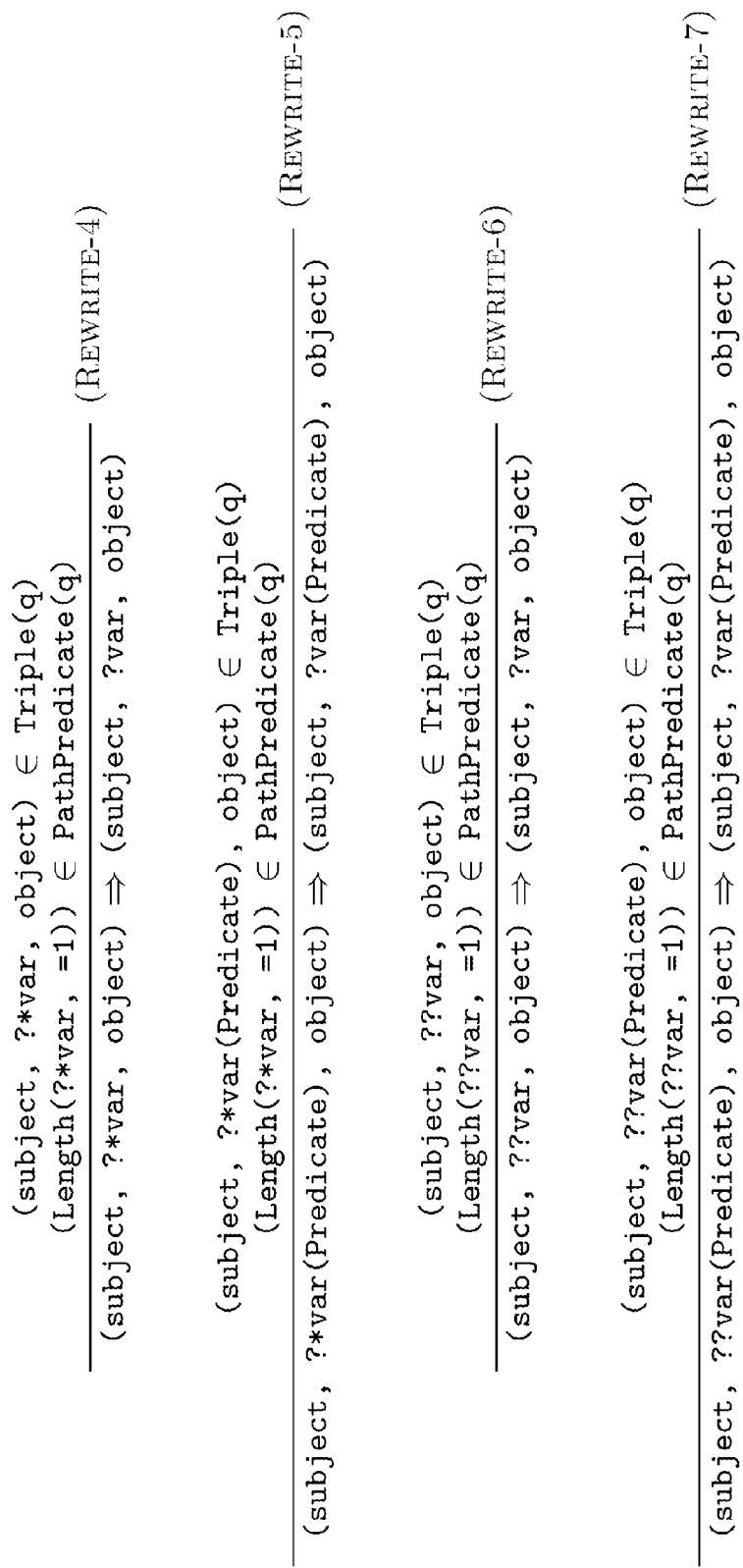

FIGS. 13A and 13B illustrate an exemplary embodiment of the just described set of query re-writing rules. The following is a sample interpretation of the REWRITE-1 query re-writing rule shown in FIG. 13A. REWRITE-1 re-writes a given triple pattern (subject, ?*var, object) of a given G-SPARQL query q (whose triple patterns are denoted as Triple(q)) into the triple pattern (subject, ??var, object) given that the path variable ?*var is not part of the output variable list of the G-SPARQL query q (which is denoted as outVarList(q)).

Figure 14:
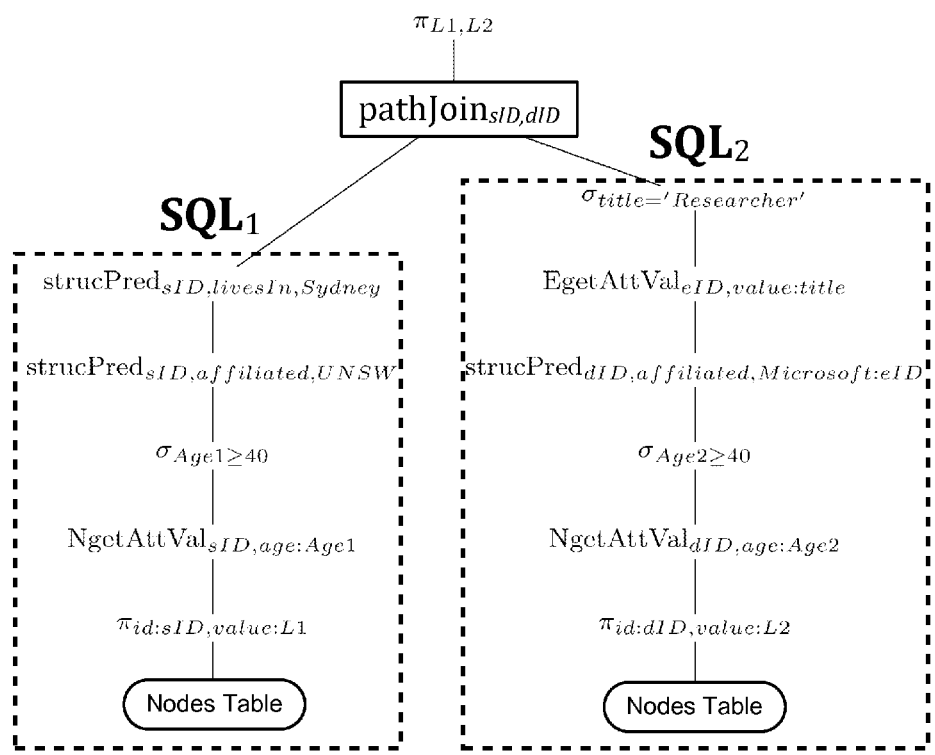
FIG. 14 is a diagram illustrating an exemplary embodiment, in simplified form, of the front-end compilation of an exemplary graph query into an exemplary query plan that includes relational operators and a non-relational graph operator.

FIG. 14 illustrates an exemplary embodiment, in simplified form, of the front-end compilation of the following exemplary G-SPARQL query into an exemplary query plan that includes relational operators and a non-relational graph operator:

---

SELECT ?L1 ?L2
  WHERE { ?X @label ?L1.           ?Y @label ?L2.
          ?X @age ?age1.         ?Y @age ?age2.
          ?X affiliated UNSW.   ?X livesIn Sydney.
          ?Y ?E(affiliated) Microsoft.
          ?E @title "Researcher".
          ?X ??P ?Y.
          FILTER (?age1 >= 40). FILTER(?age2 >= 40).}

---

1.4.3 Back-End Compiler

This section provides a more detailed description of the aforementioned exemplary back-end compiler.

Figure 15:
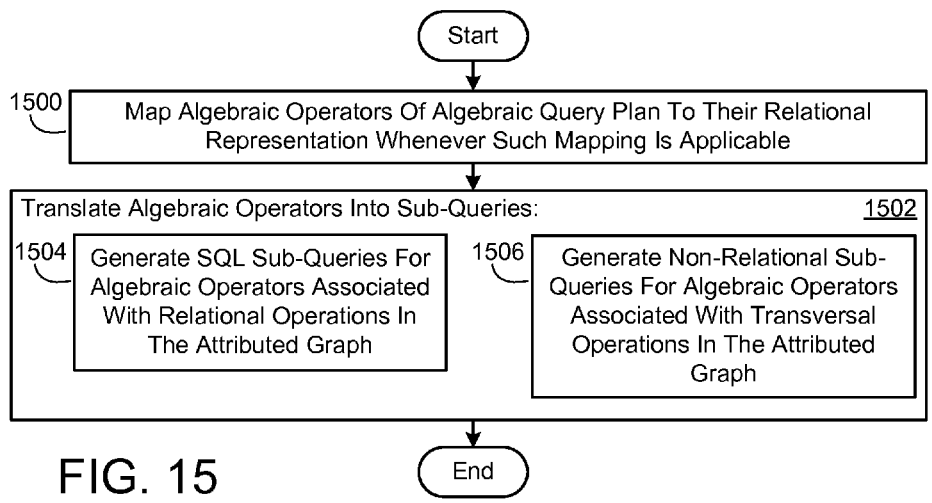
FIG. 15 is a flow diagram illustrating an exemplary embodiment, in simplified form, of a process for back-end compiling the algebraic query plan to generate a plurality of sub-queries that represent the query components of a graph query.

FIG. 15 illustrates an exemplary embodiment, in simplified form, of a process for translating the algebraic query plan into a plurality of sub-queries that represent the query components of the G-SPARQL query. As exemplified in FIG. 15, the process starts in block 1500 with mapping the algebraic operators of the algebraic query plan to their relational representation whenever such mapping is applicable. As described heretofore, FIG. 9 illustrates exemplary embodiments of such mappings. The algebraic operators of the algebraic query plan are then translated into sub-queries (block 1502), where this translation includes generating SQL sub-queries for the algebraic operators that are associated with relational operations in the attributed graph (block 1504) (e.g., the algebraic operators that are associated with the aforementioned pattern match component of the G-SPARQL query), and generating non-relational sub-queries for the algebraic operators that are associated with traversal operations in the attributed graph (block 1506) (e.g., the algebraic operators that are associated with the aforementioned reachability and shortest path components of the G-SPARQL query).

As exemplified in FIG. 14, in an exemplary embodiment of the graph query processing technique described herein the algebraic query plan that is generated by the front-end compiler can be formed as a directed acyclic graph. As such, the back-end compiler can translate the algebraic query plan into sub-queries by traversing the algebraic query plan in a bottom-up manner (e.g., starting from the "leaves" and then "climbing" the different paths back to the "root") using a conventional set of defined pattern-based translation rules. This "climbing" of a given path will stop if it reaches an algebraic operator that does not have a conventional relational representation for its semantics, or if it reaches the "root". By way of example but not limitation, all of the algebraic operators shown in FIG. 14 can be translated into SQL sub-queries except the pathJoin operator. More particularly and as indicated by the dashed boxes in FIG. 14, two SQL sub-queries (namely SQL$_1$ and SQL$_2$) are generated by the back-end compiler, where the following results of these SQL sub-queries can then be sent to either a graph engine or the memory-based component of a hybrid engine using the pathJoin operator:

---

SQL$_1$:    SELECT N1.ID as sID, N1.Value as L1
        FROM NodeLabel as N1, age, affiliated, livesIn,
          NodeLabel as N2, NodeLabel as N3
        WHERE N1.ID = age.ID AND N1.ID = affiliated.sID
          AND affiliated.dID = N2.ID AND N2.value =

```
            "UNSW" AND N1.ID = livesIn.sID AND
            livesIn.dID = N3.ID AND N3.Value = "Sydney"
            AND age.Value >= 40;
SQL₂:       SELECT N1.ID as dID, N1.Value as L2
            FROM NodeLabel as N1, age, title, affiliated,
               NodeLabel as N2
            WHERE N1.ID = age.ID AND N1.ID = affiliated.sID
               AND affiliated.dID = N2.ID AND N2.value =
               "Microsoft" AND affiliated.eID = title.ID AND
               title.Value = "Researcher" AND age.Value >= 40;
```

1.4.4 Query Execution Manager

This section provides a more detailed description of several of the aforementioned features of the query execution manager.

As described heretofore, the query execution manager uses a knowledge of which of a plurality of independent query execution engines are currently available and the characteristics of each of the available query execution engines, along with one or more engine selection rules, to identify a one of the query execution engines that is to be used to process each of the query components (e.g., the sub-query that represents each of the query components). In one embodiment of the graph query processing technique described herein performance-based engine selection rules can be used to perform this identification, where these rules specify that a pattern match component of the G-SPARQL query (e.g., the SQL sub-query that represents this component) is to be executed by either a relational database engine or the relational database component of a hybrid engine. The performance-based engine selection rules also specify that a reachability component of the G-SPARQL query (e.g., the non-relational sub-query that represents this component) is to be executed by either a graph engine or the memory-based component of a hybrid engine. The performance-based engine selection rules also specify that a shortest path component of the G-SPARQL query (e.g., the non-relational sub-query that represents this component) is to be executed by either a graph engine or the memory-based component of a hybrid engine.

In another embodiment of the graph query processing technique described herein at least a monetary-cost-based engine selection rule can be used to identify a one of the plurality of independent query execution engines that is to be used to process each of the query components, where this rule specifies that each of the query components is to be executed by a one of the plurality of independent query execution engines that is the least expensive to use. In yet another embodiment of the graph query processing technique a combination of the performance-based engine selection rules and the monetary-cost-based engine selection rule can be used to identify a one of the plurality of independent query execution engines that is to be used to process each of the query components.

Figure 17:
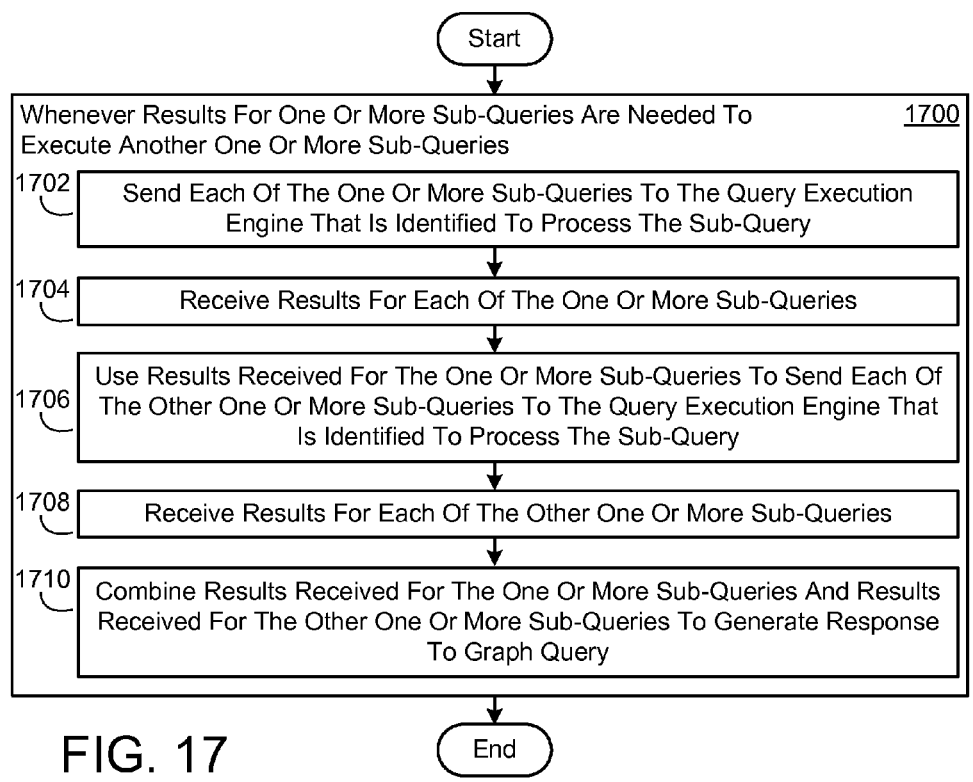
FIG. 17 is a flow diagram illustrating an exemplary embodiment, in simplified form, of a query execution management process that addresses a situation where the results for one or more sub-queries are needed to execute another one or more sub-queries.

FIG. 17 illustrates an exemplary embodiment, in simplified form, of a query execution management process that addresses the aforementioned situation where the results for a one or more of the sub-queries are needed to execute another one or more of the sub-queries. As exemplified in FIG. 17, the process starts in block 1700 with the following actions taking place whenever results for a one or more of the sub-queries are needed to execute another one or more of the sub-queries. Each of the one or more of the sub-queries is sent to the query execution engine that is identified to process the sub-query (block 1702). Results for each of the one or more of the sub-queries are then received from the query execution engine that is identified to process the sub-query (block 1704). The results received for the one or more of the sub-queries are then used to send each of the other one or more of the sub-queries to the query execution engine that is identified to process the sub-query (block 1706). Results for each of the other one or more of the sub-queries are then received from the query execution engine that is identified to process the sub-query (block 1708). The results received for the one or more of the sub-queries and the results received for the other one or more of the sub-queries are then combined to generate a response to the graph query (block 1710).

2.0 Additional Embodiments

While the graph query processing technique has been described by specific reference to embodiments thereof, it is understood that variations and modifications thereof can be made without departing from the true spirit and scope of the graph query processing technique. It is also noted that any or all of the aforementioned embodiments can be used in any combination desired to form additional hybrid embodiments or distributed embodiments. Although the graph query processing technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Exemplary Operating Environments

Figure 18:
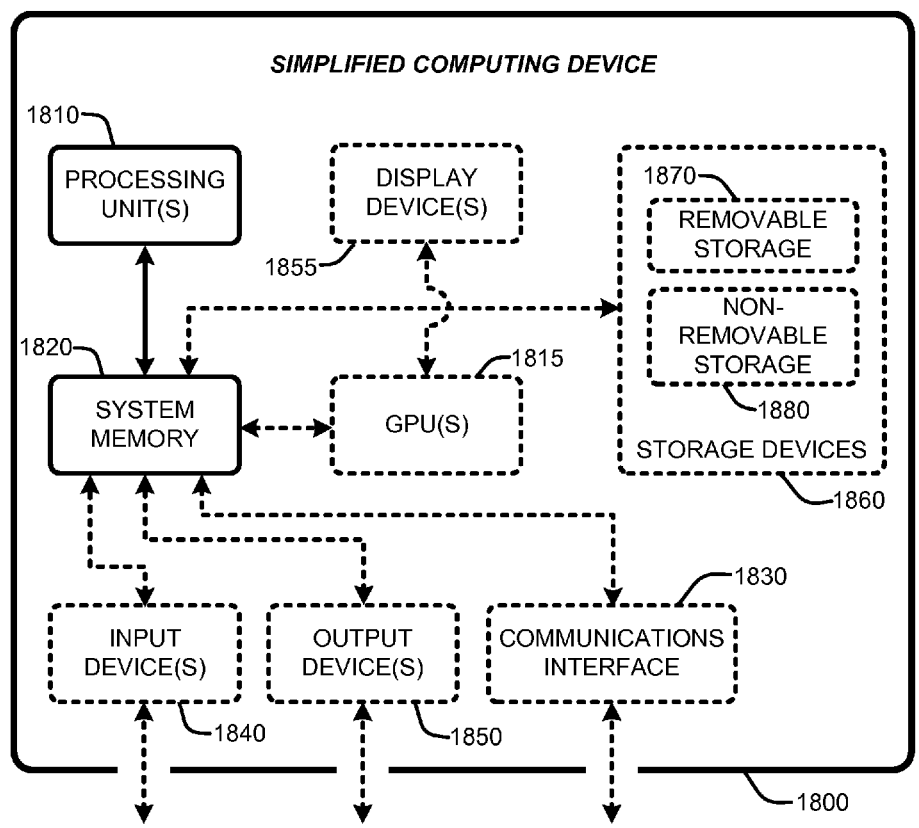
FIG. 18 is a diagram illustrating a simplified example of a general-purpose computer system on which various embodiments and elements of the graph query processing technique, as described herein, may be implemented.

The graph query processing technique embodiments described herein are operational within numerous types of general purpose or special purpose computing system environments or configurations. FIG. 18 illustrates a simplified example of a general-purpose computer system on which various embodiments and elements of the graph query processing technique, as described herein, may be implemented. It is noted that any boxes that are represented by broken or dashed lines in FIG. 18 represent alternate embodiments of the simplified computing device, and that any or all of these alternate embodiments, as described below, may be used in combination with other alternate embodiments that are described throughout this document.

For example, FIG. 18 shows a general system diagram showing a simplified computing device 1800. Such computing devices can be typically be found in devices having at least some minimum computational capability, including, but not limited to, personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, audio or video media players, and computing resources in a cloud computing environment.

To allow a device to implement the graph query processing technique embodiments described herein, the device should have a sufficient computational capability and system memory to enable basic computational operations. In particular, as illustrated by FIG. 18, the computational capability is generally illustrated by one or more processing unit(s) 1810, and may also include one or more graphics processing units (GPUs) 1815, either or both in communication with system memory 1820. Note that that the processing unit(s) 1810 of the simplified computing device 1800 may be specialized microprocessors (such as a digital signal processor (DSP), a very long instruction word (VLIW) processor, a field-programmable gate array (FPGA), or other micro-controller) or can be conventional central processing units (CPUs) having one or more processing cores including, but not limited to, specialized GPU-based cores in a multi-core CPU.

In addition, the simplified computing device 1800 of FIG. 18 may also include other components, such as, for example, a communications interface 1830. The simplified computing device 1800 of FIG. 18 may also include one or more conventional computer input devices 1840 (e.g., pointing devices, keyboards, audio (e.g., voice) input devices, video input devices, haptic input devices, gesture recognition devices, devices for receiving wired or wireless data transmissions, and the like). The simplified computing device 1800 of FIG. 18 may also include other optional components, such as, for example, one or more conventional computer output devices 1850 (e.g., display device(s) 1855, audio output devices, video output devices, devices for transmitting wired or wireless data transmissions, and the like). Note that typical communications interfaces 1830, input devices 1840, output devices 1850, and storage devices 1860 for general-purpose computers are well known to those skilled in the art, and will not be described in detail herein.

The simplified computing device 1800 of FIG. 18 may also include a variety of computer-readable media. Computer-readable media can be any available media that can be accessed by the computer 1800 via storage devices 1860, and can include both volatile and nonvolatile media that is either removable 1870 and/or non-removable 1880, for storage of information such as computer-readable or computer-executable instructions, data structures, program modules, or other data. By way of example but not limitation, computer-readable media may include computer storage media and communication media. Computer storage media refers to tangible computer-readable or machine-readable media or storage devices such as digital versatile disks (DVDs), compact discs (CDs), floppy disks, tape drives, hard disk drives, optical disk drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of any of the above should also be included within the scope of communication media.

Furthermore, software, programs, and/or computer program products embodying some or all of the various graph query processing technique embodiments described herein, or portions thereof, may be stored, received, transmitted, or read from any desired combination of computer-readable or machine-readable media or storage devices and communication media in the form of computer-executable instructions or other data structures.

Finally, the graph query processing technique embodiments described herein may be further described in the general context of computer-executable instructions, such as program modules, being executed by a computing device. Generally, program modules include routines, programs, objects, components, data structures, and the like, that perform particular tasks or implement particular abstract data types. The graph query processing technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for responding to graph queries, comprising:
   using a hardware computer comprising one or more processors and memory to perform the following process actions:
   receiving a graph query that is submitted to a graph database which is modeled by an attributed graph comprising a plurality of nodes each of which is labeled with one or more attributes, and a plurality of edges each of which is labeled with another one or more attributes, each of the nodes representing a different entity instance, each of the edges connecting a different pair of nodes, the attributes of each of the edges specifying the type of relationship that exists between the pair of nodes connected by the edge, the graph query comprising predicates based on one or more of, the topology of the attributed graph, or the attributes of the nodes and edges therein;
   decomposing the graph query into a plurality of query components;
   for each of the query components,
   identifying a one of a plurality of independent query execution engines that is available to process the query component,
   generating a sub-query that represents the query component, sending the sub-query to the identified query execution engine for processing, and
   receiving results for the sub-query from the identified query execution engine; and
   combining the results received to generate a response to the graph query.

2. The process of claim 1, wherein the query execution engines comprise one or more relational database engines.

3. The process of claim 1, wherein the query execution engines comprise one or more graph engines.

4. The process of claim 1, wherein,
   the query execution engines comprise one or more hybrid engines each comprising a memory-based component and a relational database component,
   either the attributed graph or a portion thereof is stored in the relational database component, and
   whenever a given sub-query is sent to a given hybrid engine for processing, just data associated with the topology of the attributed graph or the portion thereof is retrieved from the relational database component and stored into the memory-based component.

5. The process of claim 4, wherein the attributed graph or the portion thereof is stored in the relational database component using a fully decomposed storage model.

6. The process of claim 1, wherein the query execution engines comprise either:
one or more relational database engines and one or more graph engines; or
one or more relational database engines and one or more hybrid engines; or
one or more graph engines and one or more hybrid engines.

7. The process of claim 1, wherein the process action of identifying a one of a plurality of independent query execution engines that is available to process the query component comprises an action of using performance-based engine selection rules to perform said identification.

8. The process of claim 7, wherein the performance-based engine selection rules specify that a pattern match component of the graph query is to be executed by either a relational database engine or a relational database component of a hybrid engine.

9. The process of claim 7, wherein the performance-based engine selection rules specify that a reachability component of the graph query is to be executed by either a graph engine or a memory-based component of a hybrid engine.

10. The process of claim 7, wherein the performance-based engine selection rules specify that a shortest path component of the graph query is to be executed by either a graph engine or a memory-based component of a hybrid engine.

11. The process of claim 1, wherein the process action of identifying a one of a plurality of independent query execution engines that is available to process the query component comprises an action of using at least a monetary-cost-based engine selection rule to perform said identification, said rule specifying that the query component is to be executed by a one of the plurality of independent query execution engines that is the least expensive to use.

12. The process of claim 1, wherein the query components comprise one or more of:
one or more pattern match components; or
one or more reachability components; or
one or more shortest path components.

13. The process of claim 1, wherein the graph query is submitted by an entity, further comprising an action of presenting the response to the entity.

14. A system for responding to graph queries, comprising:
a hardware computing device comprising one or more processing units and memory; and
a computer program having program modules executable by the processing units, the processing units being directed by the program modules of the computer program to,
receive a graph query that is submitted to a graph database which is modeled by an attributed graph comprising a plurality of nodes each of which is labeled with one or more attributes, and a plurality of edges each of which is labeled with another one or more attributes, each of the nodes representing a different entity instance, each of the edges connecting a different pair of nodes, the attributes of each of the edges specifying the type of relationship that exists between the pair of nodes connected by the edge, the graph query comprising predicates based on one or more of, the topology of the attributed graph, or the attributes of the nodes and edges therein,
generate a plurality of sub-queries that represent the graph query,
for each of the sub-queries,
identify a one of a plurality of independent query execution engines that is available to process the sub-query,
send the sub-query to the identified query execution engine for processing, and
receive results for the sub-query from the identified query execution engine, and
combine the results received to generate a response to the graph query.

15. The system of claim 14, further comprising a program module for, whenever results for a one or more of the sub-queries are needed to execute another one or more of the sub-queries,
sending each of the one or more of the sub-queries to the query execution engine that is identified to process the sub-query,
receiving results for each of the one or more of the sub-queries from the query execution engine that is identified to process the sub-query,
using the results received for the one or more of the sub-queries to send each of the other one or more of the sub-queries to the query execution engine that is identified to process the sub-query,
receiving results for each of the other one or more of the sub-queries from the query execution engine that is identified to process the sub-query, and
combining the results received for the one or more of the sub-queries and the results received for the other one or more of the sub-queries to generate a response to the graph query.

16. The system of claim 14, wherein the program module for generating a plurality of sub-queries that represent the graph query comprises program modules for:
using a dialect of tuple-based algebra to translate the graph query into an algebraic query plan comprising a plurality of algebraic operators; and
translating the algebraic query plan into the plurality of sub-queries, said translation comprising program modules for,
generating one or more Structured Query Language sub-queries for the algebraic operators that are associated with relational operations in the attributed graph, and
generating one or more non-relational sub-queries for the algebraic operators that are associated with traversal operations in the attributed graph.

17. The system of claim 16, wherein the tuple-based algebra comprises:
a collection of relational operators; and
a collection of graph operators that are capable of expressing graph query operations that cannot be expressed by the relational operators.

18. The system of claim 16, wherein the program module for using a dialect of tuple-based algebra to translate the graph query into an algebraic query plan comprising a plurality of algebraic operators comprises program modules for:
using a set of inference rules to map the triple patterns of the graph query onto a set of algebraic operators;
applying a set of query re-writing rules to reduce the execution time of the graph query evaluation; and
using a set of triple pattern precedence rules to reorder said triple patterns according to their restrictiveness.

19. The system of claim 16, wherein the program module for identifying a one of a plurality of independent query execution engines that is available to process the sub-query comprises a program module for using performance-based engine selection rules to perform said identification, said rules specifying that the Structured Query Language sub-queries are to be executed by either a relational database engine or a relational database component of a hybrid engine, and also specifying that the non-relational sub-queries are to be executed by either a graph engine or a memory-based component of a hybrid engine.

\* \* \* \* \*